Dec. 3, 1963    A. A. BONNEE    3,112,516
CONTROL FOR SHIRRING MACHINE
Filed Sept. 19, 1960    7 Sheets-Sheet 1

Inventor:
Arthur A. Bonnee
By Robert R. Lockwood
Atty

Dec. 3, 1963  A. A. BONNEE  3,112,516
CONTROL FOR SHIRRING MACHINE
Filed Sept. 19, 1960  7 Sheets-Sheet 3
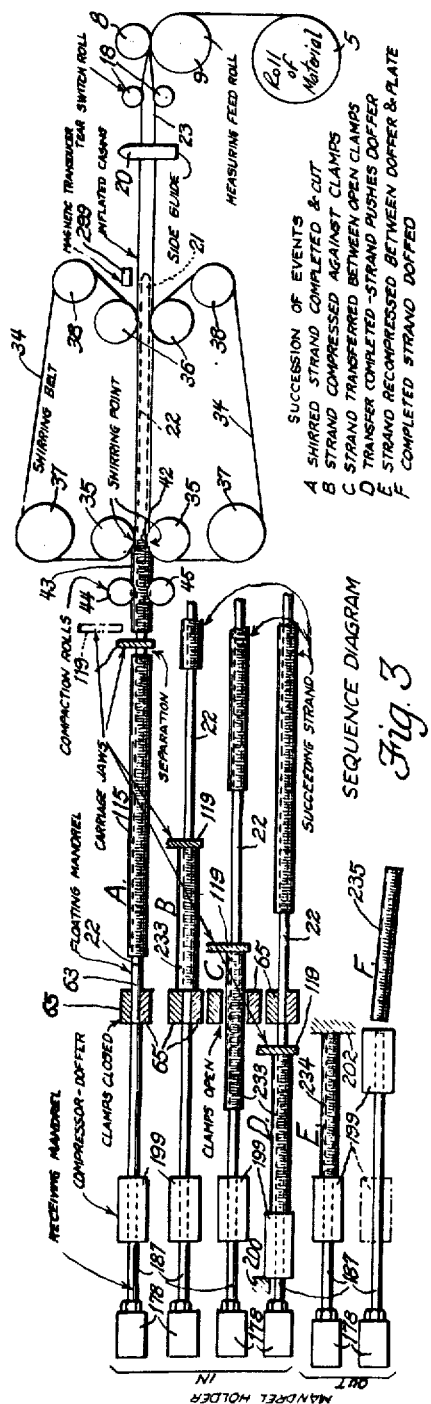
Fig. 3 SEQUENCE DIAGRAM
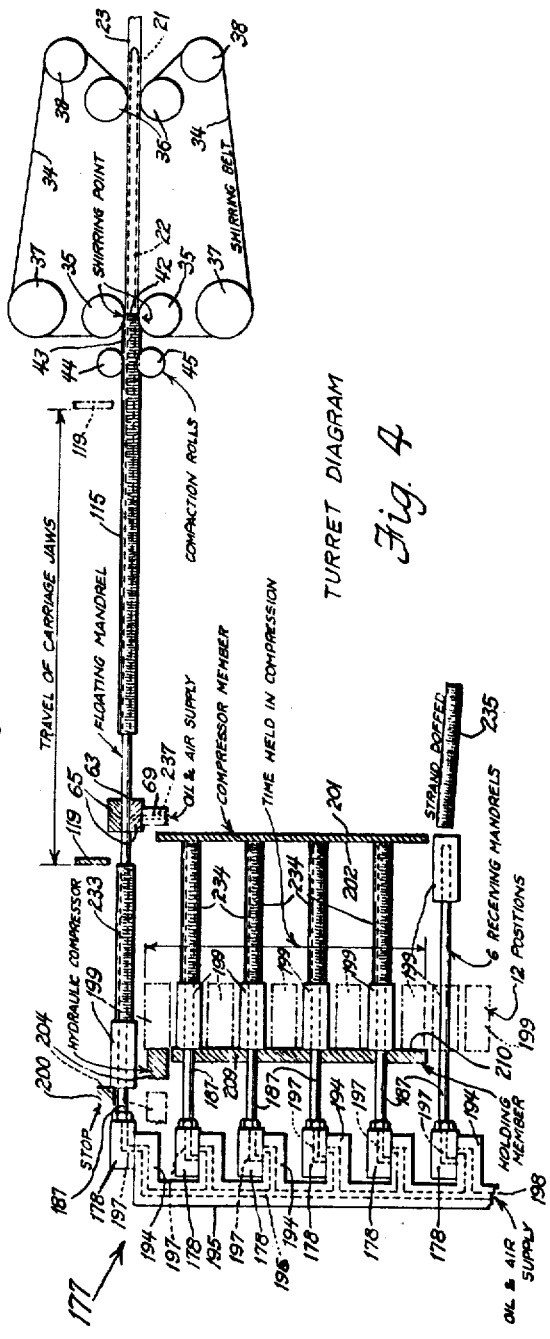
Fig. 4 TURRET DIAGRAM

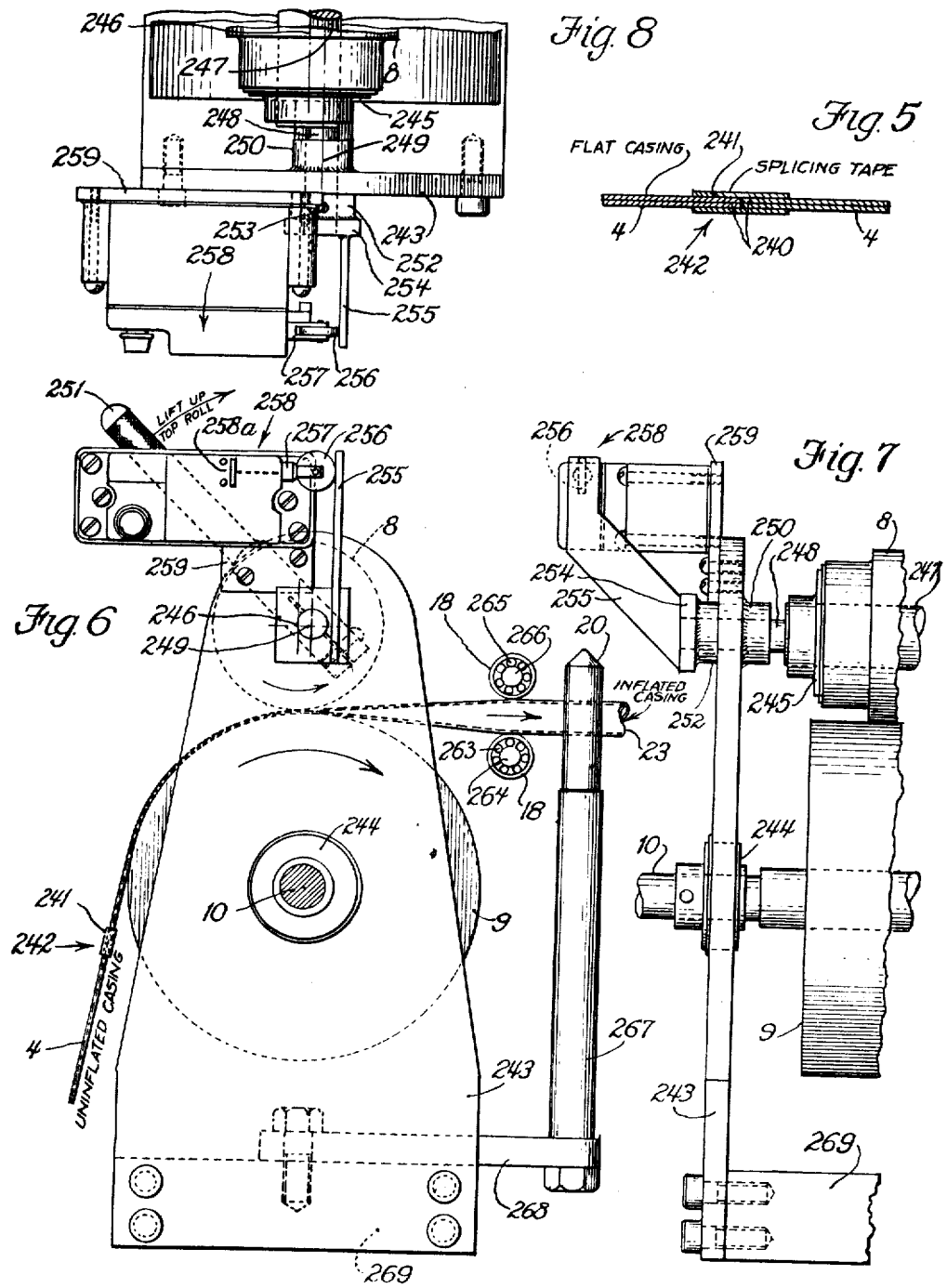

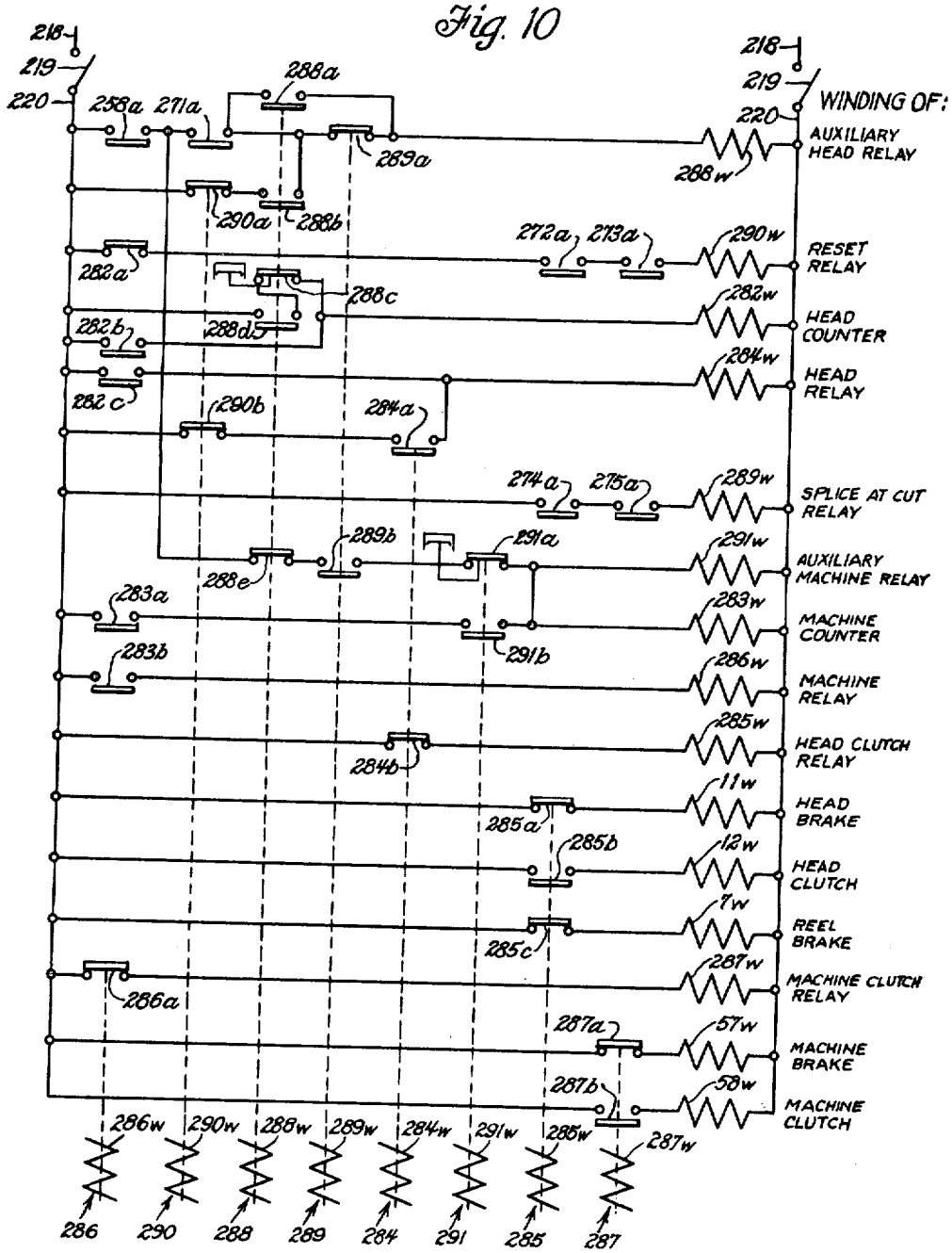

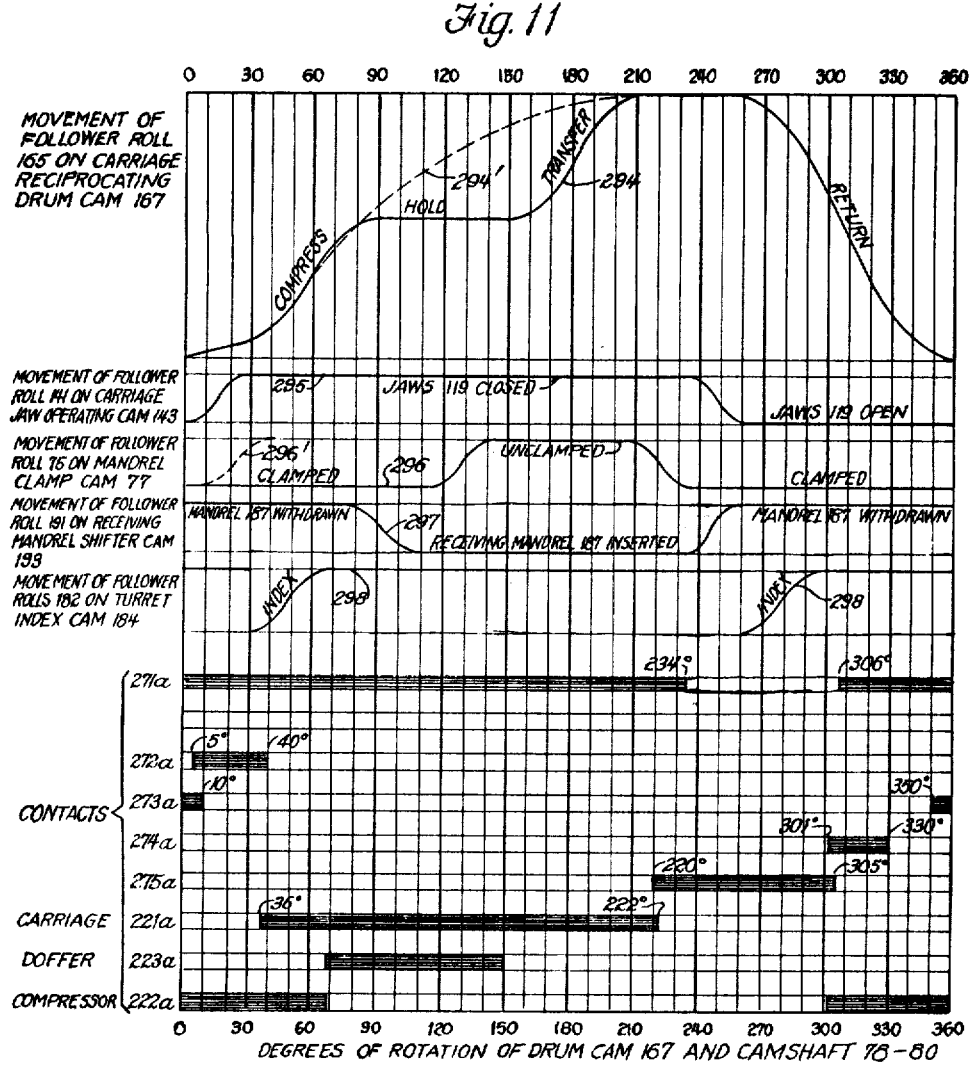

United States Patent Office 3,112,516
Patented Dec. 3, 1963

3,112,516
CONTROL FOR SHIRRING MACHINE
Arthur A. Bonnee, Chicago, Ill., assignor to Tee-Pak, Inc., Chicago, Ill., a corporation of Illinois
Filed Sept. 19, 1960, Ser. No. 57,033
16 Claims. (Cl. 17—42)

This invention relates, generally, to the control of a machine for shirring thin walled cellulosic sausage casings and the like into shirred strands and it has particular relation to controlling the operation thereof when a splice is detected in the unshirred casing. The control system in which the present invention is embodied can be used with the shirring machine disclosed in copending application Serial Number 57,057, filed September 19, 1960, and assigned to the assignee of this application.

As disclosed in the application above referred to a machine is provided for shirring thin walled cellulosic sausage casings into strands which have an extended length depending upon the particular application for the shirred strand. For example, the shirred strand may contain one hundred feet of casing or more or lesser amounts depending upon the adjustment of the machine. The shirred strands of casing are formed by a shirring head on the feeding thereto of unshirred casing from a reel containing an indefinite length or a supply of the unshirred casing.

Splices occur at intervals throughout such a reel as a result of the requirements and conditions occurring during the manufacture of the casings. It is not feasible to space the splices uniformly in the unshirred casing because of manufacturing conditions with the result that the splices appear at random locations along the unshirred casing throughout a reel of such material. Approximate calculation, based on an extrusion speed of 70' per minute with the cuts occurring at 15 minute intervals, and where there is some allowance for variations in the manufacture, indicates that approximately 6, 8, and 13 percent for 55, 80 and 100 foot shirred strands, respectively, will contain a splice. The portion of a shirred strand appearing before a splice in that strand can be marketed as a random length or, in a separate cutting operation, it can be salvaged for sale in the next standard length with the subsequent waste of the remaining portion. Likewise the same condition holds true for that portion of the shirred strand appearing after a splice.

In accordance with the present invention provision has been made for minimizing the loss of shirred casing following a splice. It is possible to obtain a saving of the order of 85 percent of the material appearing after a splice for utilization in the next full strand. Assuming that the operating conditions are equalized over a long production run, it is reasonable to expect that 50 percent of the strands otherwise appearing as random lengths and waste in which a splice is incorporated, can be utilized in the production of the desired lengths of strand.

In the machine disclosed in the application above referred to, provision is made for severing a shirred strand from the following shirred casing. The operation of the severing means depends upon a particular relationship between a scoring yoke or cutter that cooperates with a floating mandrel on which the casing is shirred, which relationship is likely to be materially interfered with in the event that the splice should occur at the locus of severing. In addition to providing for salvaging a certain amount of casing that otherwise would be disposed of as waste, the present invention provides for detecting the presence of a splice which would occur at the locus of severing and insuring that the severing operation is postponed to the end that it takes place after the splice has passed the locus of severing.

Among the objects of this invention are: To provide for minimizing the loss of shirred casing incident to the occurrence of a splice in the unshirred casing as it is obtained from a supply thereof of indefinite length having splices at random locations therealong; to shirr the casing into strands the last of which after the detection of a splice has this splice present therein; to detect the presence of a splice along the casing before the next shirred strand is severed from the following shirred casing and to control the operation of the shirring head and severing machine according to the location that the splice would occupy in the next shirred strand if the splice were not detected; to operate the shirring head and severing machine in such a manner as to position the splice in the next shirred strand adjacent to the end that is last severed; to stop the operation of the shirring head while continuing the operation of the severing machine when the splice, if undetected, would be located relatively remote from the last severed end of the next shirred strand, the shirring head being stopped immediately after it has shirred a sufficient length of the casing to position the splice just past the locus of severing; to stop the operation of the severing machine while continuing the operation of the shirring head when the splice, if undetected, would be located at the locus of severing of the next shirred strand from the following shirred casing, the severing machine being stopped long enough to permit the shirring head to shirr an additional length of the casing sufficient to position the splice just past the locus of severing; to employ contacts operating synchronously with the operation of the severing machine for determining whether the shirred head or the severing machine is to be stopped; to provide splice detecting means in the form of contacts that are operated when a splice occurs to cooperate with the synchronously operating contacts selectively to initiate the operation of head and machine counters which accurately measure, respectively, lengths of casing to be shirred and at the proper time initiate a sequence of operations that stop momentarily, the shirring head or the severing machine as the case may be; and after the shirring head has been stopped to restart it under the control of the synchronously operating contacts in order to provide a full length of casing in the next shirred strand.

In the drawings:

FIGS. 1 and 2, taken together with FIG. 1 being placed to the left of FIG. 2, show in perspective and somewhat diagrammatically an automatic shirring machine with which the present invention can be employed.

FIG. 3 is a sequence diagram showing the succession of events taking place in the shirring of a strand by the shirring head onto the floating mandrel and the succession of events which takes place as the shirred strand progresses through the shirred casing handling machine.

FIG. 4 is a turret diagram which shows one position of the turret where one of the receiving mandrels is in alignment with the floating mandrel, certain of the receiving mandrels have the shirred strand held in compression thereon and the receiving mandrel, next to be moved into alignment with the floating mandrel, has the strand thereon doffed therefrom.

FIG. 5 is a vertical sectional view, at an enlarged scale, of a typical splice formation at the abutting ends of the flat casing.

FIG. 6 is a view, in side elevation and looking from right to left of the measuring roll as shown in FIG. 2, of one of the supports for the measuring roll and the squeeze roll and parts associated therewith for detecting the presence of a splice.

FIG. 7 is a view in side elevation, looking from right to left, of the construction shown in FIG. 6.

FIG. 8 is a top plan view of the portion of the apparatus shown in FIG. 6, except that the end portion only of the squeeze roll is shown and the operating handle, shown in FIG. 6, is not illustrated.

FIG. 10 shows, diagrammatically, the circuit connections that are used in conjunction wtih the apparatus shown in FIG. 9 for the purpose of controlling the operation of the shirring machine shown in FIGS. 1–2, upon the occurrence of a splice in the unshirred casing.

FIG. 11 is a chart which shows various operations that are performed during a period of operation of the casing severing means.

Figure 1:
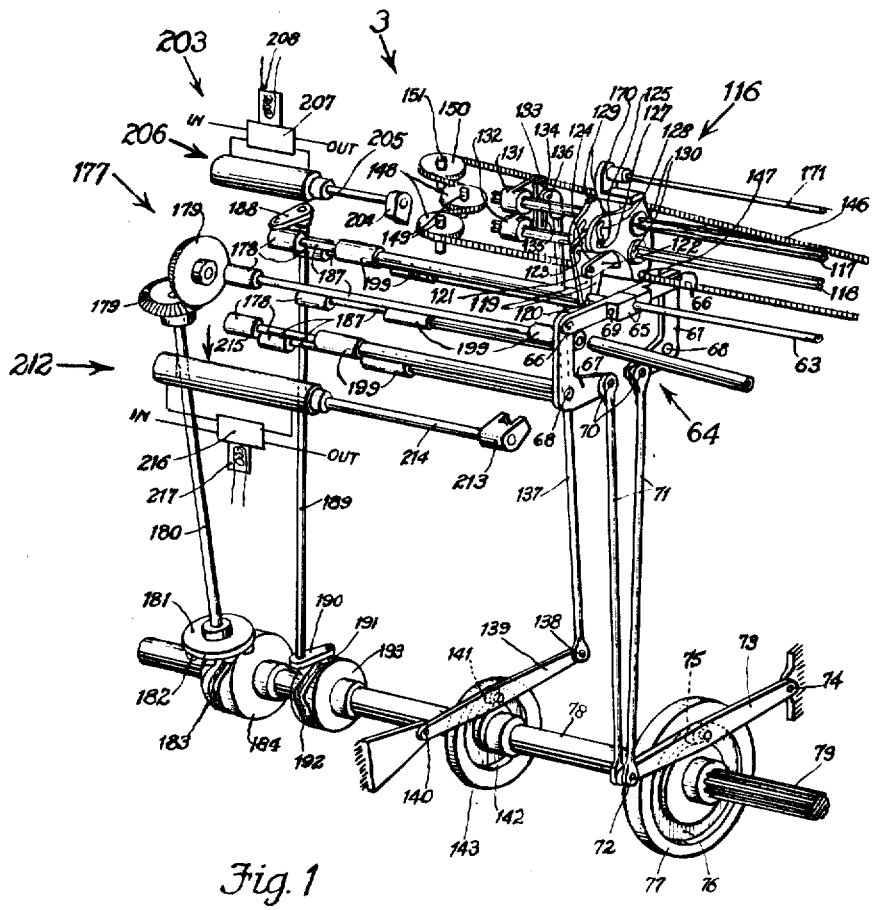
Figure 2:
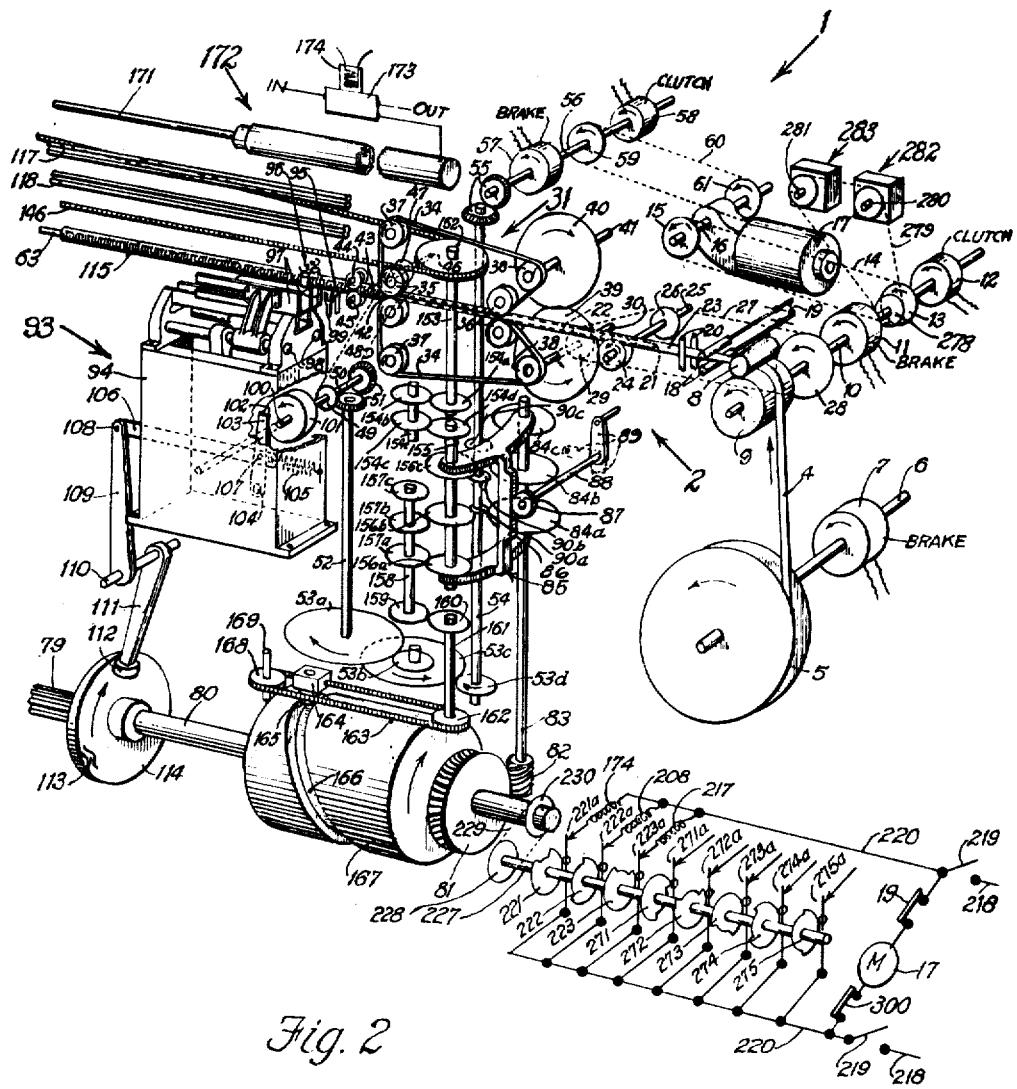

Referring now particularly to FIGS. 1 and 2 of the drawings, positioned in side-by-side relation, the reference character 1 designates, generally, a shirring machine embodying the present invention. The shirring machine 1 includes a head mechanism, shown generally at 2, and a shirred casing handling machine, shown generally at 3. It will be understood that the head mechanism 2 and the shirred casing handling machine 3 are mounted on a single frame structure, which is not shown in order to illustrate more clearly the features of construction of the various parts of the shirring machine 1.

The shirring machine 1 is arranged and constructed for automatically shirring a thin walled tubular cellulosic sausage casing 4 of indefinite length as it is unwound from a reel 5. Various lengths of shirred strand are formed by the shirring machine 1. For example, shirred strands can be formed having extended lengths of 55′, 80′, or 100′ as may be desired. These extended lengths of shirred strands are illustrative of typical lengths and it will be understood that greater and lesser lengths can be shirred. The extended lengths can be of the order of 40′ to 150′, more or less, as may be desired and depending upon the construction of the shirring machine 1. In order to shirr these various lengths of casing the shirred casing handling machine 3 is movable endwise with respect to the head mechanism 2. The shirring machine 1 will be described for operation on conjunction with the shirring of the 100′ lengths of casing and the manner in which suitable adjustment is made for shirring the other lengths of casing will be described.

The reel 5 on which the casing 4 is wound flatwise is mounted for rotation with a shaft 6. Associated with the shaft 6 is an electrically operated brake 7 which is normally energized when the shirring machine 1 is in operation and is deenergized when the shirring machine 1 is stopped, or in particular when the head mechanism 2 is stopped, in order to prevent further unwinding of the casing 4. The flat tubular casing 4 is threaded between a squeeze roll 8 and a measuring roll 9 and the arrangement is such that the casing 4 is unreeled from the reel 5 at the speed of 8′ per second, although other speeds can be employed if desired. The squeeze roll 8 can be driven by friction between it and the casing 4 or it can be geared to the measuring roll 9 to rotate synchronously therewith.

The measuring roll 9 is mounted for rotation with a shaft 10 on which an electrically operated brake 11 is provided which, like the brake 7, is arranged to be deenergized when the shirring machine 1 is stopped, or in particular when the head mechanism 2 is stopped, to prevent further rotation of the shaft 10. The shaft 10 is connected through an electrically operated clutch 12 to a sprocket 13 which is driven by a chain 14 from a drive sprocket 15 on a drive shaft 16 which is rotated by a drive motor 17 that preferably is a variable speed motor and is arranged to rotate the shaft 16 at a speed of 320 r.p.m. The motor preferably is a three phase alternating current motor. However, for illustrative purposes it is shown and described herein as a single phase motor to simplify the disclosure.

It is desirable that means be provided for detecting a defect in the casing 4 after it passes between the squeeze roll 8 and the measuring roll 9 and before it is operated upon by the head mechanism 2. For this purpose tear rolls 18—18 are provided above and below the casing immediately to the left of the squeeze roll 8 and measuring roll 9. Normally they are held apart by pressure of the inflated casing to hold the contacts of a tear switch 19 closed. As long as the contacts of the tear switch 19 remain closed, the motor 17 continues to be energized, unless otherwise controlled. However, should a defect in the casing appear causing it to deflate, the tear rolls 18—18 move toward each other and open the contacts of the tear switch 19 and deenergize the drive motor 17.

The casing 4 is directed by vertically extending side guide rolls 20—20, immediately to the left of the tear rolls 18—18, onto the leading end 21 of a horizontal tubular floating mandrel 22. Air under pressure flows through the floating mandrel 22 and out of its leading end 21 for inflating the casing, as indicated at 23, in order to facilitate shirring the operation. Positioned underneath the leading end 21 of the floating mandrel 22 is a support roll 24 having a grooved surface for interfitting with the inflated casing 23 and supporting the leading end 21 of the floating mandrel 22. The support roll 24 is caused to rotate in the direction indicated by the arrow thereon at a peripheral speed which is equal to the linear speed at which the inflated casing 23 moves onto the floating mandrel 22. For this purpose the support roll 24 is mounted on a shaft 25 for rotation therewith. A sprocket 26 is fast on the shaft 25 and is driven by a chain 27 from a sprocket 28 that is fast on the shaft 10. The chain 27 also extends over a sprocket 29 on a shaft 30 which is employed for driving a shirring head that is indicated, generally, at 31 that can be constructed as disclosed in U.S. Patent No. 2,722,714, issued November 8, 1955.

The shirring head 31 employs upper and lower shirring belts 34—34 which are provided with shirring dogs and are trained over pairs of pinions 35—35 and 36—36 positioned above and below the inflated casing 23 intermediate the ends of the floating mandrel 22 and nearer to the leading end 21 thereof. The shirring belts 34—34 also are trained over pairs of pinions 37—37 and 38—38. The arrangement is such that the shirring belts 34—34 effect the shirring operation on the inflated casing 23 continuously. It will be observed that the lower right pinion 38 is mounted on the shaft 30 for rotation therewith. By this means the lower shirring belt 34 is driven. Fast on the shaft 30 is a gear 39 which drives a gear 40 which is fast on a shaft 41 on which the upper right pinion 38 is mounted. Thus the upper and lower shirring belts 34—34 are driven at the same speed in the directions indicated by the arrows on the several pinions to effect the shirring operation between the pairs of pinions 35—35 at the point 42. The shirring casing is indicated at 43 immediately to the left of the point of shirring 42. While the shirring head 31 has been described as employing the shirring belts 34—34, it will be understood that other shirring means can be employed. For example, instead of using two shirring belts located on opposite sides of the inflated casing 23, three such shirring belts can be employed equally spaced around the inflated casing or 120° apart. Whatever type of shirring head 31 is employed, the arrangement preferably is such that it operates continuously to shirr the inflated casing 23 at the shirring point 42 to provide the shirred casing 43 which moves along the floating mandrel 22 at a uniform speed. For the conditions above described the shirred casing 43 moves along the floating mandrel 22 at a speed of 3.2″ per second.

With a view to insuring that the shirred casing 43 moves along the floating mandrel 22 at a uniform speed, compaction means in the form of upper and lower compaction rolls 44 and 45 are located above and below the floating mandrell 22 in juxtaposition to the point of shirring 42 and to the left of the shirring head 31. They are formed of soft resilient material and are centrally grooved in order to avoid any damage to the shirred casing 43 as it moves therebetween. The upper compaction roll 44 may rotate freely or it may be driven with the lower compaction roll 45 which is mounted for rotation with a shaft 46 on which a sprocket 47 is mounted to be driven by a chain 48 from a sprocket 49 on a shaft 50. The arrangement is such that the peripheral speed of the lower compaction roll 45 is equal to or less than the speed at which the shirred casing 43 moves along the floating mandrel 22.

The shaft 50 is driven from the drive motor 17 in the following manner. The shaft 50 is driven through mitre gears 51—51 from a shaft 52 which extends vertically and has connection through reduction gears 53a, 53b, 53c and 53d with a vertical shaft 54 that is driven by mitre gears 55—55 from a horizontal shaft 56 on which there is an electrically operated brake 57. The arrangement is such that, on deenergization of the drive motor 17 or other control causing the rotation of the shaft 56 to cease, the brake 57 is effective to stop such further rotation and further movement of the parts driven thereby. The shaft 56 is connected by an electrically operated clutch 58 to a sprocket 59 which is driven by a chain 60 from a drive sprocket 61 on the shaft 16. By suitably controlling the energization of the clutch 58, it is possible to stop rotation of the shaft 56 and movement of the parts driven thereby while the motor 17 continues to drive the shaft 10 through the clutch 12. Likewise, is is possible to operate the clutch 12 and prevent further rotation of the shaft 10 and parts driven thereby while permitting the shaft 56 to continue to rotate. In general, it is pointed out that the shirred casing handling machine 3 is driven by the drive motor 17 through the shaft 56 and parts driven thereby and that the head mechanism 2 is driven by the shaft 10 and the elements directly connected thereto. By selectively controlling the energization of the clutches 58 and 12 it is possible selectively to control the operation of the shirred casing handling machine 3 and the head mechanism 2 as may be desired. Ordinarily, however, the operation of the shirring machine 1 is a continuous operation with the clutches 58 and 12 being deenergized or unclutched only under certain special circumstances requiring such action.

The floating mandrel 22, as the name implies, floats between the shirring belts 34—34 with the unshirred inflated casing 23 moving over the leading end 21 and being shirred, in the manner described, against the compaction rolls 44—45. The floating mandrel 22 is held in this position at its trailing end 63 by clamp means, indicated generally at 64. The clamp means 64 not only holds the floating mandrel 22 against endwise and sidewise movement, but also it holds it against rotation about its longitudinal axis. However, since the casing is shirred, as indicated at 43, onto the floating mandrel 22, it is necessary to provide means for unclamping the clamp means 64 in order to permit the transfer of the shirred casing from the floating mandrel 22. At the same time, it is necessary to hold the floating mandrel 22 against endwise and sidewise movement as well as against rotary movement. The manner in which this is accomplished will be described presently.

The clamp means 64 includes clamp members 65—65 which are arranged to engage the trailing end 63 of the floating mandrel 22 from opposite sides and to hold it not only against endwise and sidewise movement but also against rotation about its longitudinal axis. The clamp members 65—65 are pivoted at their ends at 66—66 on the upwardly extending arms of bell cranks 67—67 which are pivoted at 68—68 about fixed axes.

In order to supply air under pressure to the tubular floating mandrel 22 for inflating the casing at 23 at the leading end 21, an air connection 69 is provided in one of the clamp members 65. The air connection 69 is provided with a valve arrangement which prevents the escape of the compressed air when the clamp members 65—65 are disengaged from the trailing end 63 of the floating mandrel 22. As will be described hereinafter,
air under pressure continues to flow through the floating mandrel 22 for maintaining the casing inflated at 23 after the clamp members 65—65 are moved out of engagement with the trailing end 63 of the floating mandrel 22.

The other arms of the bell cranks 67—67 are pivotally connected at 70—70 to the upper ends of operating rods 71—71 which are commonly pivoted at 72 to the outer end of a clamp operating lever 73 which is pivoted at 74 about a fixed axis. Intermediate the ends of the clamp operating lever 73 is a follower roll 75 which interfits with a cam groove 76 in a box type mandrel clamp cam 77 which is fast on a horizontal cam shaft 78.

It has been pointed out hereinbefore that the shirred casing handling machine 3 is movable relative to the head mechanism 2 in order to accommodate different lengths of shirred strands of casing. Also, it has been pointed out that the shirring machine 1 is shown in the position for shirring 100' lengths of casing. In this position the shirred casing handling machine 3 is located furthest away from the head mechanism 2. In order to accommodate this shifting of the shirred casing handling machine 3, the cam shaft 78 has a splined connection 79 with a cam shaft 80 that is arranged to be rotated at a speed of one revolution in each twelve and one-half seconds for the handling of 100' shirred strands. Provision is made for increasing this speed to accommodate shorter lengths of shirred strands. In effect, then, the cam shaft 78 and the cam shaft 80 can be considered as a single shaft with the splined connection 79 therebetween.

Fast on the cam shaft 80 is a worm wheel 81 which is driven by a worm 82 on a vertical shaft 83. Slidable on the vertical shaft 83 are gears 84a, 84b and 84c that are arranged to be moved axially of the vertical shaft 83 by a gear shifter yoke 85. The gear shifter yoke 85 includes a rack 86 with which a pinion 87 has driving engagement and is mounted on a shaft 88 for rotation by a crank 89. The gear shifter yoke 85 occupies a position corresponding to the lowest speed of the cam shaft 80. Accordingly, the crank 89 is shown by full lines. It is shown by broken lines in two other positions which correspond, respectively, to the two higher operating speeds for the cam shaft 80. Fast on the vertical shaft 54, which it will be recalled is driven by the motor 17, are gears 90a, 90b and 90c. It will be noted that the gear 90a has driving connection with the gear 84a and that the gears 90b and 90c are out of engagement. On movement of the gear shifter yoke 85 by rotation of the crank 89 to the intermediate position, the gear 84a is moved out of engagement with the gear 90a and gear 84b is moved into driving engagement with gear 90b. Likewise, when the crank 89 is moved to the lowermost position shown by the broken lines, the gear 84b is moved out of driving engagement with the gear 90b and the gear 84c is moved into driving engagement with the gear 90c.

After a predetermined length of the shirred casing 43 has moved past the compaction rolls 44—45, it is desirable that this length be severed from the following shirred casing to permit the shirred strand, thus severed, to be moved off of the floating mandrel 22 for subsequent treatment in a manner to be described. For this purpose shirred casing severing means, or a severing machine shown generally at 93, is employed. It includes a housing 94 that is stationarily mounting on the frame of the shirring machine 1 between the shirring head 31 and the shirred casing handling machine 3. In order to provide separation between the length of shirred strand to be severed from the following shirred casing a holding finger or digger 95 is movably mounted on the housing 94 and, at the appropriate time, is arranged to move upwardly about ⅜" in order to separate the adjacent folds and pleats of the shirred casing 43. The arrangement is such that the holding finger or digger 95 not only is moved upwardly to engage and separate the shirred casing 43 adjacent the compaction rolls 44—45 but also it moves along the floating mandrel 22 at the speed at which the shirred casing 43 moves therealong.

In order to facilitate the severance of the shirred strand from the preceding shirred casing 43, pinch rolls 96—96 are mounted on pinch roll brackets 97—97. The pinch rolls 96—96 are rotated in the directions indicated by the arrows associated therewith for refolding the folds and pleats of that portion of the casing which is extended from the holding finger or digger 95. The arrangement is such that the pinch rolls 96—96 move along the floating mandrel 22 at a speed which is greater than the speed at which the casing 43 is shirred. The pinch rolls 96—96 are formed of soft material of a frictional character and are moved toward each other to pinch the shirred casing therebetween against the floating mandrel 22. Since the pinch rolls 96—96 move along the floating mandrel 22 at a speed in excess of the speed at which the holding finger or digger 95 moves therealong, the intervening portion of the casing is unfolded. At the same time, the pitch rolls 96—96 are rotated in the directions indicated at a peripheral speed which is several times the speed at which the shirred casing 43 moves along the floating mandrel 22 for the purpose, as stated, of refolding the unfolded casing after it has been severed from the following shirred casing. The pinch rolls 96—96 are mounted on pinch roll brackets 97—97 which, in turn, are mounted on horizontal shafts 98—98 carried by the housing 94. The arrangement is such that, when the severing operation is to be performed, the pinch roll brackets 97—97, which normally are spaced away from the floating mandrel 22, are rotated toward each other to bring the pinch rolls 96—96 into the engagement previously described with the shirred casing and at the same time the pinch rolls 96—96 are rotated.

After the holding finger or digger 95 is moved into engagement with the shirred casing 93 in the manner described and the portion of the casing to the left is extended through the operation of the pinch rolls 96—96, a scoring yoke or cutter 99 is moved upwardly about 2⅜″ to engage tightly the opposite sides of the floating mandrel 22 with the extended portion of the casing therebetween. The scoring yoke or cutter 99 is of bifurcated construction with the arms being formed by relatively stiff round wires or like rigid members which have substantially point contact engagement with opposite sides of the mandrel 22 and serve to score the casing. This starts the casing to tear and to be severed on opposite sides of the floating mandrel 22. Since the pinch rolls 96—96 are moved along the floating mandrel 22 at such a speed as to apply an endwise tension to that portion of the casing between them and the holding finger or digger 95, the tension thus applied is sufficient to complete the severance of the casing which is started by the scoring operation in the manner described. Provision is made also for moving the scoring yoke or cutter 99 along the floating mandrel 22 at the same speed that the holding finger or digger 95 moves therealong. The movement of the holding finger or digger 95 and of the scoring yoke or cutter 99 along the floating mandrel 22 is the order of 2⅜″ after which they are moved downwardly through an extent equal to the extent that they were moved upwardly as described. Thereafter, the pinch rolls 96—96, after having completed their refolding operation on the portion of the casing that was extended to permit the severing operation, are moved laterally away from the floating mandrel 22 by a corresponding outward movement of the pinch roll brackets 97—97.

The shirred casing severing means 93 is operated periodically by a shaft 100 which is driven by a one revolution clutch 101 at a speed of 30 r.p.m. The clutch 101 is mounted on the shaft 50, previously described, and is driven thereby. The one revolution clutch 101 is prevented from rotating by a shoulder 102 that extends radially therefrom for engagement by a detent 103 which is pivoted at 104 about a fixed axis on the housing 94.

A spring 105 normally holds the detent 103 in position to engage the shoulder 102. The spring 105 is connected to a link 106 which is connected at 107 to the detent 103. The left end of the link 106 is pivoted at 108 to the upper end of an arm 109 which is fast on a horizontal shaft 110 which has a cam arm 111 fast thereon. At its lower end the cam arm 111 carries a roll 112 which is arranged to be engaged by a cam surface 113 on a trip cam 114 that is fast on the cam shaft 80. It will be understood that the periodicity of operation of the shirred casing severing means or the severing machine 93 is controlled by the speed at which the cam shaft 80 is rotated. This speed is varied, as above described, by changing the position of the gear shifter yoke 85 in accordance with the length of the strand that is to be shirred. The shirred and severed strand is indicated at 115.

Provision is made for compressing the shirred strand 115 against the clamp members 65—65 and subsequently for transferring it from the floating mandrel 22. For this purpose a carriage shown generally at 116 is provided. The carriage 116 is arranged to be reciprocated along the floating mandrel 22 from an initial position adjacent the compaction rolls 44—45 where the shirred strand 115 is severed from the following shirred casing 43 and a terminal position beyond the trailing end 63 of the floating mandrel 22. The carriage 116 is mounted for such reciprocatory movement by horizontally extending upper and lower support rails 117—118 which are mounted at their left ends as cantilevers. Also, the support rails 117—118 are rotatable about their longitudinal axes to effect certain control operations of carriage jaws 119—119 which are mounted on the carriage 116. The carriage jaws 119—119 have semi-circular ends 120—120 that are arranged to surround the floating mandrel 22 at a position adjacent the compaction rolls 44—45 after the casing has been severed in the manner above described. However, the arrangement is such that the semi-circular ends 120—120 have substantial clearance with the floating mandrel 22 and their left sides are arranged to engage the right end of the severed shirred strand 115 so that, on movement of the carriage 116 to the left, the shirred strand 115 is correspondingly moved along the floating mandrel 22. The carriage jaws 119—119 are pivoted at 121 on an arm 122 which extends from and is rotatable with the lower rail 118. The carriage jaws 119—119 have a scissors like movement with respect to the floating mandrel 22 and with respect to a receiving mandrel aligned therewith as described hereinafter. The upper ends of the carriage jaws 119—119 are pivoted at 123—123 to links 124—124 which, in turn, are pivoted on a transverse pin 125 which extends at its ends through slots having vertical lower slot portions 127—127 and upper arcuate slot portions 128—128 in carriage plates 129—129 between which the carirage jaws 119—119 and the links 124 are mounted. Carriage bearings 130—130 are provided for mounting the carriage 116 for movement along the upper and lower support rails 117—118. The arrangement for operating the carriage jaws 119—119 is such as to cause them to move toward opposite sides of the floating mandrel 22 for engaging the shirred strand 115 after it has been severed. In addition, the positions of the carriage jaws 119—119 are controlled to move them upwardly out of registry with the clamp members 65—65 after these clamp members are closed with the carriage 116 in the position shown in FIG. 1 and thereafter it is moved from the terminal position back to the initial position along the support rails 117—118.

The operation of the carriage jaws 119—119 with respect to the carriage 116 is effected by rotating the support rails 117—118 about their longitudinal axes. This is accomplished by selectively rotating upper and lower operating arms 131—132 which are keyed, respectively, to the upper and lower support rails 117—118. Pivoted to the upper operating arm 131 at 133 is a link 134 having a slot 135 at its lower end which provides a lost motion connection to the lower operating arm 132. Provision is made for biasing the operating arms 131 and 132 toward each other by means of a coil tension spring. Pivotally connected at 136 to the link 134 is the upper end of an operating rod 137 the lower end of which is pivoted at 138 to a carriage clamp operating lever 139 which is pivoted at 140 about a stationary axis. A follower roll 141 is carried by the carriage clamp operating lever 139 intermediate its ends and it projects into a cam groove 142 in a box type carriage jaw operating cam 143 which is fast on the cam shaft 78. The shape of the cam groove 142 and the speed at which the carriage jaw operating cam 143 rotates are such as to effect the proper operation of the carriage jaws 119—119 to permit movement of the carriage 116 from the terminal position shown in FIGURE 1 past the clamp members 65—65 to the initial position adjacent the compaction rolls 44—45 and also to move the semi-circular ends 120—120 into operative position on opposite sides of the floating mandrel 22 for engaging the severed end of the shirred strand 115.

For moving the carriage 116 in the reciprocatory manner previously referred to, a chain 146 is provided. The chain 146 is connected at 147 to the carriage 116 so that tension applied in one direction or the other causes it to move in the corresponding direction. The chain 146 is trained over sprockets 148—148 which are mounted, respectively, on shafts 149—149 that are arranged to move with the shirred casing handling machine 3 when it is adjusted to accommodate a different length of shirred strand 115. In addition, the chain 146 is trained over a sprocket 150 that is mounted on a shaft 151, the axis of which is fixed with respect to the head mechanism 2. Thus the shaft 151 and sprocket 150 mounted thereon remain stationary when the shafts 149—149 and sprockets 148—148 mounted thereon are moved in the manner described for adjusting purposes. The chain 146 is driven in one direction or the other by a sprocket 152 which is fast on a vertical shaft 153 the axis of rotation of which is positioned to the right of the compaction rolls 44—45 in order to permit the travel of the carriage 116 to the initial position. The vertical shaft 153 is driven through a train of gears comprising gears 154a, 154b, 154c, and 154d by a vertical shaft 155 on which gears 156a, 156b, and 156c are mounted to be shifted by the gear shifter yoke 85 for selective engagement with gears 157a, 157b, and 157c that are fast on a vertical shaft 158. The gears 154b and 154c are mounted for rotation with a vertical shaft 154e. Recalling that the shirring machine 1 is shown in the position for shirring 100′ lengths of casing, the gear shifter yoke 85 is in a corresponding position so that the gear 156a is in driving engagement with the gear 157a on the shaft 158 and the latter rotates at a corresponding speed. When the gear shifter yoke 85 is moved to the intermediate position, the gear 156a is moved out of engagement with the gear 157a and the gear 156b is moved into driving engagement with the gear 157b. Likewise, when the shifter yoke 85 is moved to the third position, the gear 156b is moved out of driving engagement with the gear 157b and the gear 156c is moved into driving engagement with the gear 157c. Also mounted on the vertical shaft 158 is a gear 159 which is in driving engagement with a gear 160 that is fast on the upper end of a vertical shaft 161 at the lower end of which these is fast a sprocket 162. Trained over the sprocket 162 is a chain 163. Secured to the chain 163 is a block 164 from which a follower roll 165 depends for engagement with a cam groove 166 in a barrel type carriage reciprocating cam 167 that is fast on the cam shaft 80. The chain 163 is also trained over a sprocket 168 on a shaft 169. As the cam shaft 80 is rotated in the manner described, the carriage reciprocating cam 167 is correspondingly rotated and the follower roll 165 moves along the cam groove 166. The arrangement is such that the follower roll 165 and the chain 163 are moved, first in one direction and then in the other, to effect a corresponding rotation of the sprocket 152 in one direction or the other and a corresponding movement of the carriage 116 along the support rails 117—118 in one direction or the other.

When the carriage 116 moves from right to left with the carriage jaws 119—119 having their semi-circular ends 120—120 in engagement with the severed end of the shirred strand 115, the strand 115 is moved to the left along the floating mandrel 22 and its left end engages and is stopped by the clamp members 65—65 while the right end continues to be moved as the carriage 116 continues to move in this direction. The shirred strand 115 then is compressed against the clamp members 65—65. Since substantial force is required to compress the shirred strand 115 in this manner and because of the manner in which the carriage 116 is moved in the compressing direction by the chain 146 from the carriage reciprocating cam 167 through the intervening mechanical connections, it is desirable that additional force be made available for moving the carriage 116 while it is compressing the shirred strand 115. For this purpose a bracket 170 is mounted on the carriage 116 and a connecting rod 171 interconnects it with a single acting air operator that is indicated, generally, at 172. The air operator 172 is controlled by a three way solenoid valve 173. A solenoid 174 controls the operation of a valve 173 in proper timed relation with the operation of the cam shaft 80. The operation of the air operator 172 is such that, as the carriage 116 is moved to the left and the shirred strand 115 is compressed against the clamp members 65—65, air pressure is applied to the air operator 172 to assist the movement of the carriage 116 in this direction for completing the compressing operation against the clamp members 65—65, and, after they are opened, assisting in moving the carriage 116 to transfer the shirred and compressed strand 115 from the floating mandrel 22. Thereafter the solenoid valve 173 is operated to exhaust the compressed air to the atmosphere for free retraction of the connecting rod 171 to its initial position.

With a view to handling the shirred strand 115 after it is transferred from the floating mandrel 22 for subsequent further compression thereof, a turret, shown generally at 177, is provided. The turret 177 is rotatable about a horizontal axis which is parallel to the longitudinal axis of the floating mandrel 22. The turret 177 includes receiving mandrel holders 178 which are illustrated as being six in number. The receiving mandrel holders 178 are uniformly circumferentially spaced about the axis of rotation of the turret 177 and also are mounted for individual endwise movement through a slight extent relative to the turret 177 itself. Mitre gears 179—179 are employed to drive the turret 177 and they connect it with an inclined shaft 180 which has a circular plate 181 at its lower end from which follower rolls 182 depend for engagement with and disengagement from a cam groove 183 that extends around a barrel type turret index cam 184 that is fast on the cam shaft 78. The arrangement of the follower rolls 182 and the cam groove 183 is such that the inclined shaft 180, and thereby the turret 177, is indexed through twelve steps for a complete rotation of the turret 177. The follower rolls 182 one by one successively engage and disengage the cam groove 183 for each revolution of the index cam 184 to rotate the shaft 180 and thereby the turret 177 through 30° for each revolution of the index cam 84.

Extending forwardly from each of the receiving mandrel holders 178 is a horizontal tubular longitudinally apertured receiving mandrel 187. There are six receiving mandrel holders 178 and six receiving mandrels 187. They are arranged, on indexing of the turret 177, to be moved, one by one, into endwise alignment with the floating mandrel 22 for receiving therefrom the shirred strand 115. With a view to moving the receiving mandrel 187 that is in alignment with the floating mandrel 22 into endwise engagement therewith for supporting it against endwise, sidewise and rotary movement, a receiving mandrel shifter arm 188 is provided that is arranged to operatively engage, one by one, the receiving mandrel holders 178 as the turret 177 is indexed. It will be understood that the receiving mandrel shifter arm 188 is operatively connected to the receiving mandrel holder 178 carrying the receiving mandrel 187 that is in alignment with the floating mandrel 22 and that this operative engagement takes place when the turret 177 is indexed to this position. The receiving mandrel shifter arm 188 is fast on the upper end of a vertical shaft 189 which has a radially extending arm 190 at the lower end that carries a follower roll 191 which extends into cam groove 192 in a receiving mandrel shifter cam 193 that is fast on the cam shaft 78. The arrangement and construction of the receiving mandrel shifter cam 193 and associated parts are such as to effect a relatively slight endwise movement of each receiving mandrel holder 178 and the receiving mandrel 187 carried thereby into endwise engagement with the floating mandrel 22 when in alignment therewith. This endwise movement may be of the order of 9/16".

It was pointed out hereinbefore that air is supplied under pressure to the air connection 69 in one of the clamp members 65 for inflating the casing as indicated at 23. When the clamp members 65 are disengaged from the trailing end 63 of the floating mandrel 22, it is desirable that the flow of air under pressure be continued. This is accomplished by supplying air under pressure through the longitudinal aperture in the particular receiving mandrel 187 that is in endwise supporting engagement with the floating mandrel 22. The arrangement for accomplishing this continued supply of air under pressure is shown diagrammatically in FIG. 4 of the drawings. Here it will be observed that each of the receiving mandrel holders 178 is movable with respect to a part 194 of an air manifold 195 which is circular in construction but is shown in developed form in FIG. 4 for illustrative purposes. An air passageway 196 extends through the air manifold 195 and through the several parts 194, as shown, for connection to an air passageway 197 in each of the receiving mandrel holders 178 when they are moved forwardly, one by one, as shown uppermost in FIG. 4, to move the respective receiving mandrel 187 into endwise supporting engagement with the floating mandrel 22 at its trailing end 63. When a mandrel holder 178 is thus moved forwardly, the air passageway 197 therein is in communication with the air passageway 196 in the respective part 194 and air under pressure then can be supplied from an air supply, indicated at 198, through the respective tubular receiving mandrel 187 into the tubular floating mandrel 22 to maintain the inflated condition of the casing at the leading end 21 in the manner previously described. When the receiving mandrel holders 178 are in the retracted position, as shown in FIG. 4 for the other mandrel holders, the connections to the air passageway 196 in the respective parts 194 of the air manifold 195 are closed off and thus the compressed air is not permitted to escape.

It is desirable that the shirred strand 115, after it has been transferred onto one of the receiving mandrels 187, be recompressed and that it be held under compression for a predetermined time which is the time that is required to rotate the turret 177 substantially through a complete revolution. For this purpose a compressor-doffer 199 is slidably mounted on each of the receiving mandrels 187. The compressor-doffer 199 on the receiving mandrel 187 which is in alignment with the floating mandrel 22, as shown in the uppermost part of FIG. 4, is limited in its movement to the left by a stop 200. When the shirred strand 115 is shifted by the carriage 116 onto the receiving mandrel 187 in this position, it picks up the compressor-doffer 199 on this particular receiving mandrel 187 and moves it against the stop 200.

As soon as the turret 177 has been indexed to the next step following the position where the shirred strand 115 was transferred to the receiving mandrel 187 in alignment therewith, it is desirable that it be recompressed as noted. For this purpose, as shown in FIG. 4, a compressor member 201 is employed which has a compressor surface 202 against which the shirred strand 115 can be endwise compressed by moving the compressor-doffer 199 on the next receiving mandrel 187 toward the compressor member 201. In order to accomplish this compressing action, compressor means, shown generally at 203 in FIG. 1, is employed. The compressor means 203 includes a pusher 204 that is mounted at the forward end of a connecting rod 205 which extends from a compressor hydraulic operator 206. A solenoid valve 207, having a solenoid 208, is employed for controlling the energization of the compressor hydraulic operator 206 to move the pusher 204 either forwardly or rearwardly on the application of suitable hydraulic pressure. Provision is made, as the turret 177 is indexed, for connecting the pusher 204 operatively to the compressor-doffers 199, one by one, and then the solenoid valve 207 is operated by energization of the solenoid 208 to operate the compressor hydraulic operator 206 for moving the next compressor-doffer 199 toward the compressor member 201 and away from the stop 200. The movement of the compressor-doffer 199 is sufficient to move its left end past a holding member 209, FIG. 4, which is provided with a holding surface 210 that is in parallel spaced relation to the compressor surface 202 on the compressor member 201. As the turret 177 is subsequently indexed, the compressor-doffers 199, one by one, are moved from the pusher 204 in the extended position to engage the holding surface 210. Thus, as the turret 177 is subsequently indexed, the compressor-doffers 199 bear against the holding surface 210 while the shirred strands bear against the compressor surface 202 and thus they are held under compression on the respective receiving mandrel 187 during subsequent indexing of the turret 177.

After the turret 177 has completed nearly a full revolution and a receiving mandrel 187 has been moved beyond the edges of the compressor surface 202 and the holding surface 210, it is desired that the completed strand be doffed from this particular receiving mandrel 187. For this purpose doffer-means, shown generally at 212 in FIG. 1, is employed. The doffer-means 212 includes a doffer yoke 213 that is arranged to engage the compressor-doffers 199, one by one, as they are moved into the doffing position on indexing of the turret 177. The doffer yoke 213 is mounted at the outer end of a connecting rod 214 which extends from a doffer hydraulic operator, shown generally at 215. The doffer hydraulic operator 215 is controlled by a solenoid valve 216 which has a solenoid 217 that is arranged to be energized at the proper time for effecting the desired operation of the doffer hydraulic operator 215.

The electrical circuits that can be employed for effecting the energization of certain of the electrical devices previously described in proper timed relation are shown at the lower right side of FIG. 2. Here it will be observed that conductors 218—218 are provided which can be connected to a suitable source, such as a 115 volt, 60 cycle alternating current source. These conductors are connected by switches 219—219 to conductors 220—220. On closure of the switches 219—219 the conductors 220—220 are energized and, if the contacts of the tear switch 19 are closed, as shown, by the separation of the tear rolls 18—18 by the inflated casing 23, the motor 17 is energized and it operates to perform the drive functions previously described on the assumption that the clutches 12 and 58 are engaged.

It will be noted that the solenoids 174, 208, and 217 are connected between the conductors 220—220 for energization through contacts 221a, 222a, and 223a, respectively. Provision is made for energizing these solenoids by closing these contacts in the desired timed relationship through cams 221, 222, and 223 respectively, which are mounted for rotation with an auxiliary cam shaft 227. The auxiliary cam shaft 227 can be an extension of the cam shaft 80 or can be driven therefrom through the agency of a sprocket 228 on the auxiliary cam shaft 227 connected by a chain 229 to a sprocket 230 on the cam shaft 80.

In operation, assuming that the conductors 218—218 are properly energized, the switches 219—219 are closed and the drive motor 17 is energized to operate the head mechanism 2 and the shirred casing handling machine 3 together with the shirred casing severing means or severing machine 93, in the manner generally described hereinbefore. As pointed out, the shirring head 31 is driven continuously to effect a shirring action on the inflated casing 23 between the upper and lower shirring belts 34—34 at the shirring point 42 against the compaction rolls 44—45. The casing then is shirred, as indicated at 43, on the floating mandrel 22.

As illustrated in FIG. 3 of the drawings, after the shirred strand 115 has been separated by operation of the severing or the severing machine 93, the carriage jaws 119 are closed around the floating mandrel 22 adjacent the severed end of the shirred strand 115, as shown in step A, and they are thus moved to the left on corresponding movement of the carriage 116. The shirred strand 115 is compressed against he clamp members 65—65. This is illustrated as step B where the shirred strand, compressed on the floating mandrel 22, is indicated at 233, it being understood that this is the same strand 115 which is shown in step A as being uncompressed on the floating mandrel 22. Next, the clamp cam 77 operates to move the clamp members 65—65 out of clamping engagement with the trailing end 63 of the floating mandrel 22 after a receiving mandrel 187 has assumed the functions of the clamp members 65—65 in supporting the floating mandrel 22 against endwise, sidewise and rotary movement. This action of the receiving mandrel 187 was initiated in step A, continued in step B and maintained in step C where, with the clamp members 65—65 opened, they permit the compressed strand 233 to be transferred past the clamp members 65—65 by continued movement of the carriage jaws 119 to the position shown in step D. When the transfer of the shirred strand 233 takes place in step C, the compressor-doffer 199 on the receiving mandrel 187 is picked up and as shown for step D, it is moved against the stop 200 where further movement is prevented. In the meantime, the clamp members 65—65 have reclosed as indicated in step D. Thus, when the carriage 116 is returned to the initial position, the carriage jaws 119—119 not only are disengaged from the opposite sides of the respective receiving mandrel 187, but also they are bodily moved upwardly to clear the closed clamp members 65—65 as the carriage 116 is moved back to its initial position along the support rails 117—118. In position E the compressor-doffer 199 has been moved forwardly toward the compressor surface 202 on the compressor member 201 by engagement by the pusher 204 and operation of the compressor hydraulic operator 206. The compressed strand is indicated at 234. After the compressed strand 234 has been held, as described hereinbefore and illustrated in FIG. 4, in the compressed position with one end against the compressor surface 202 and the other against the respective compressor-doffer 199, which is held against the holding surface 210 of the holding member 209, the completed strand 235 is doffed as indicated by position F in FIG. 3 on engagement of the doffer yoke 213 with the respective compressor-doffer 199 in the doffing position. Here the compressor-doffer 199 is moved slightly past the right end of the respective reciving mandrel 187 to doff the completed strand 235.

It will be recalled that one of the clamp members 65 is provided with an air connection 69 which is shown in FIG. 1 of the drawings. This air connection 69 is shown in FIG. 4 as being connected to a air supply at 237 which may be the same as the air supply 198 connected to the air manifold 195. Combined with the compressed air that is supplied at 198 and 237 is a lubricant, such as mineral oil or other relatively inert material. The lubricant is atomized and mixed with the air before it is fed at 198 and 237 to flow out of the leading end 21 of the floating mandrel 22 and then over the external surface thereof to leak out under the shirred casing 43 after it has been severed. This provides a thin film over the surface of the floating mandrel 22 and falilitates sliding of the shirred casing therealong.

The twelve positions to which the turret 177 is indexed are shown in FIG. 4. By full lines the positions of the compressor-doffers 199 are shown where one of the receiving mandrels 187 is aligned with the floating mandrel 22. The broken line showing of the compressor-doffers 199 indicates the intermediate position of the turret 177. This position is employed to transfer the next compressor-doffer 199 from the pusher 204 onto the holding surface 210 of the holding member 209.

Where data are specified herein with respect to speed, distance, voltage and the like, it will be undestood that the purpose of such references is to illustrate possible values that can be employed, it being understood that other values can be used as and where desired.

As pointed out hereinbefore the unshirred casing 4 is unwound from a reel 5 and is fed to the shirring head 31 to be shirred onto the floating mandrel 22 where splices appear at random locations along the unshirred casing 4. A typical arrangement of a splice is illustrated in FIG. 5 where it will be observed that the ends 240—240 of the unshirred casing 4 are arranged in abutting relation and are secured in this relation by a short length of splicing tape 241. The splice is indicated, generally, at 242, and as pointed out, occurs at random locations along the casing 4. It is desirable to minimize the amount of shirred casing that appears in a strand immediately following a splice 242. Also it is desirable to avoid engagement of the scoring yoke or cutter 99 with the splicing tape 241. In order to take care of these two conditions, provision is made, as will appear hereinafter, for operating the shirring head 31 and the shirred casing severing means or the severing machine 93 to cause the severing operation, performed by the scoring yoke or cutter 99, to occur immediately after the splice 242 has moved past the locus of severing or past the scoring yoke or cutter 99 along the floating mandrel 22. When these devices are operated in this manner, there is a minimum of length of shirred casing immediately following the splice 242. Stated differently, the operations of the shirring head 31 and of the severing machine 93 are such as to position the splice 242 substantially at the end of a shirred strand the length of which may be either the same as or slightly more than the usual length of a shirred strand or substantially less depending upon the operating conditions.

In order to detect the presence of the splice 242 in the unshirred casing 4 as it is unwound from the reel 5, the apparatus shown in FIGS. 6, 7, and 8 is provided. Upwardly extending support members 243 are employed. Two of them are used and they are mounted in spaced relation at opposite ends of the squeeze roll 8 and measuring roll 9 on a frame of the general type shown in U.S. Patent No. 2,722,714, issued November 8, 1955. Only one of the support members 243 is shown in FIGS. 6, 7 and 8 of the drawings but it will be understood that another like support member is provided and that these support members carry bearings one of which is indicated at 244 for supporting the ends of the shaft 10 on which the measuring roll 9 is mounted. It will be recalled that the shaft 10 is driven through the clutch 12 by the drive motor 17.

The squeeze roll 8 is mounted for rotation on bearings 245, one of which is shown, to rotate about a horizontal axis 246, FIG. 8, of a shaft 247 which is provided with eccentric shaft extensions one of which is shown at 248 where the arrangement is such that the squeze roll 8 and the shaft 247 can rotate about an axis 249 of the eccentric shaft extension 248 for the purpose of lifting the squeeze roll 8 upwardly away from the measuring roll 9. Each shaft extension 248 is journaled in bearings 250, one of which is shown, that are secured to the respective support member 243 by welding as indicated. A handle 251, FIG. 6 is secured to the eccentric shaft extension 248 at the opposite end of the squeeze roll 8 from that shown in FIG. 6 for the purpose of manually rotating the shaft extensions 248 and thereby raising the squeeze roll 8 out of engagement with the measuring roll 9.

In operation of the shirring machine 1, the squeeze roll 8 and the measuring roll 9 rotate in the directions indicated by the arrows appearing thereon in FIG. 6, where the uninflated casing 4 moving therebetween is illustrated. In the event that a splice as indicated at 242 should appear, because it provides a substantially extra thickness as seen in FIG. 5 between the squeeze roll 8 and the measuring roll 9, the former would be lifted upwardly to an extent depending upon the additional thickness as a result of the presence of the splicing tape 241. Advantage is taken of this upward displacement of the squeeze roll 8 to detect the presence of the splice 242 and to utilize the change in position of the squeeze roll 8 and more particularly the rotation of the shaft 247 about the axis 249 of the shaft extensions 248 to provide a signal which is employed for controlling the operation of the shirring head 31 or of the shirred casing severing means or severing machine 93, selectively, as the case may be.

It will be observed that a collar 252 is provided on the projecting end of the shaft extension 248 and is secured thereto by a transverse pin 253. A plate 254 is welded to the collar 252 and it has welded thereto an upwardly and outwardly extending arm 255 that is arranged to engage a roller 256 at the outer end of a plunger 257 which operates contacts 258a of a splice detecting switch that is shown generally at 258. The contacts 258a are referred to herein as splice detecting contacts and they are closed on the occurrence of a splice 242 between the squeeze roll 8 and the measuring roll 9. The splice detecting switch 258 includes a suitable housing that is mounted on a bracket 259 which is carried by the upper end of the support member 243. The arrangement is such that, on the occurrence of the splice 242 between the squeeze roll 8 and the measuring roll 9, the former is lifted to an extent depending upon the additional thickness provided by the splicing tape 241. This results in a slight rotation of the shaft extensions 248 about the axis 249 and a corresponding counter clockwise movement of the arm 255, as viewed in FIG. 6, to engage the roller 256 and depress the plunger 257 with the result that splice detecting contacts 258a close momentarily and then open as soon as the splice 242 has moved past the squeeze roll 88 and the measuring roll 9.

It will be understood that other splice detecting means can be employed instead of the mechanical arrangement just described.

FIG. 6 shows additional features of construction of the shirring machine 1. It will be observed that a ball bearing 263 is provided on which the lower tear roll 18 is mounted for rotation about a horizontal stationary axis 264. The upper tear roll 18 is mounted for rotation on a ball bearing 265 about a horizontal vertically movable axis 266 to control the operation of the tear switch contacts 19 for the purpose of opening them in the event that the inflated casing 23 should develop a tear and become deflated. It also will be observed that vertically extending posts 267 have the side guide rolls 20—20 mounted thereon, there being two posts 267 suitably spaced apart on an arm 268 which extends from a transverse plate 269 that forms a part of the frame (not shown) for the shirring machine 1.

Provision is made for closing and opening certain contacts synchronously with respect to the operation of the severing machine 93 which is driven by the motor 17 through the clutch 58 for the purpose of periodically causing the scoring yoke or cutter 99 to engage the separated folds or pleats of the shirred casing 43 for initiating the severing operation which is completed in the manner described hereinbefore. It will be recalled that the cam shaft 80 rotates in definite timed relation with the operation of the severing machine 93 and that the auxiliary cam shaft 227, driven therefrom by the chain 229, likewise has the same relationship. Accordingly, as shown in FIG. 2, cams 271, 272, 273, 274, and 275 are mounted for rotation with the auxiliary cam shaft 227 and these cams are arranged to control the operation, respectively, of contacts 271a, 272a, 273a, 274a, and 275a. No attempt has been made to show the particular shapes or contours of the cams 271 to 275 or of the cams 224, 225, 226. However, the relationship of these cams to the respective contacts operated thereby, is shown in the chart appearing in FIG. 11 where the operation of the several cams is shown for one complete revolution of the cam shaft 80. It will be observed that cams 271 to 275, by virtue of the driving connections from the drive motor 17, operate synchronously with respect to the periodic operation of the severing machine 93. It follows that the contacts 271a to 275a, likewise operate synchronously with respect to the operation of the severing machine 93.

Referring again to FIG. 2 of the drawings it will be observed that a sprocket 278 is mounted on the shaft 10 for rotation therewith when the clutch 12 is energized to place the motor 17 in driving connection therewith. A chain 279 is trained over the sprocket 278 and also over sprockets 280 and 281 that are arranged to operate, respectively, a head counter, shown generally at 282, and a machine counter, shown generally at 283. The head counter 282 and the machine counter 283 are arranged to measure accurately the number of revolutions of the shaft 10 which in turn are directly related to the number of feet of unshirred casing 4 that pass between the squeeze roll 8 and the measuring roll 9. It will be recalled that the control operations for the shirring head 31 and for the severing machine 93 are carried out in such a fashion as to cause the severing operation to take place after the splice 242 has moved past the locus of severing or past the scoring yoke or cutter 95. Since this location is a substantial distance beyond the squeeze roll 8 and measuring roll 9 in the direction in which the unshirred casing 4 moves and since its movement is at a relatively high speed, it is desirable that accurate measuring means be provided. The head counter 282 and machine counter 283 perform these functions and can be of any suitable type. For example the "Micro-flex" revolution counter manufactured by Eagle Signal Company of Moline, Illinois can be employed. However, it will be understood that other makes and types of counting equipment can be used. As will appear hereinafter, the head counter 282 and machine counter 283, while constantly driven as long as the shaft 10 is in driving relation with the motor 17, are provided with contacts which are controlled following the detection of a splice 242 and closure of the splice detecting contacts 258a in a manner to be described hereinafter.

Figure 9:
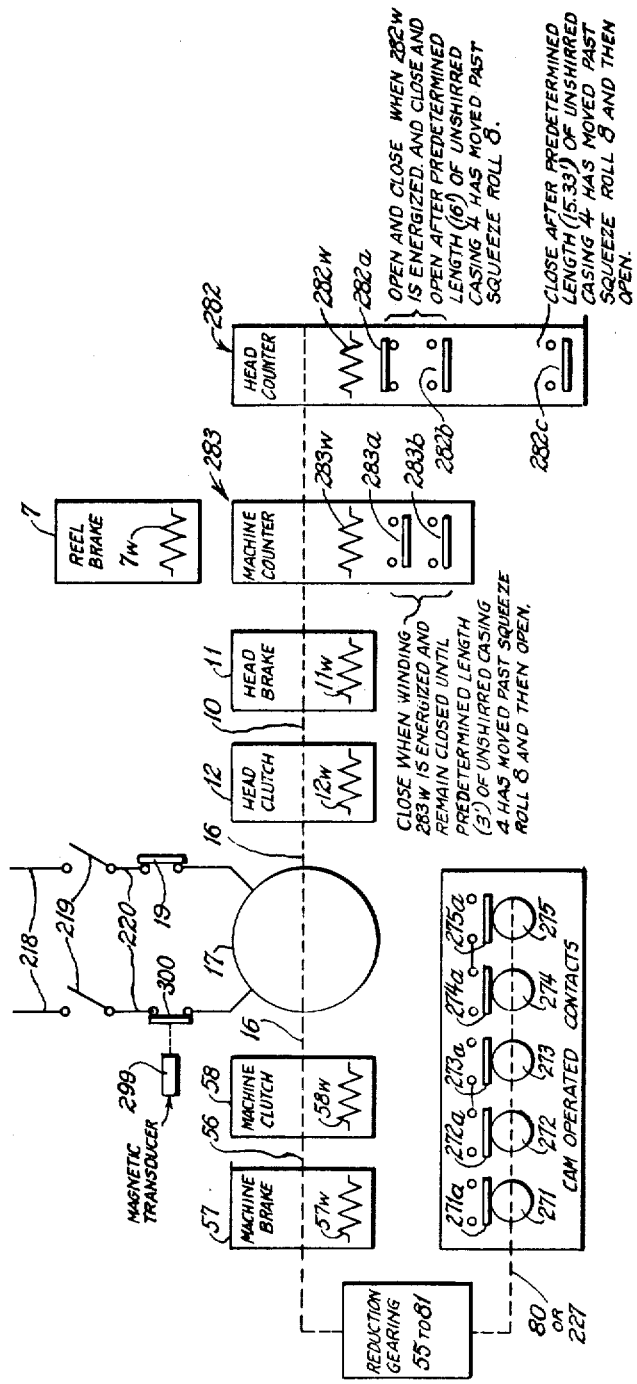
FIG. 9 shows, diagrammatically, the drive motor and certain of the control elements associated therewith.

Referring now particularly to FIG. 9 of the drawings it will be observed that the relationship between the drive motor 17 and various associated elements is indicated diagrammatically. A brief description of these elements is in order.

On closure of the switches 219—219 to complete the circuit to the energized conductors 218—218, the drive motor 17 is energized provided that the tear switch contacts 19 are closed. These contacts are closed by the separation of the tear rolls 18—18 when the inflated casing 23 continues to be inflated therebetween as seen in FIGS. 2 and 6 of the drawings. It will be recalled that the drive motor 17 rotates the shaft 16 and that it is connected by the machine clutch 58 on energization of machine clutch winding 58w, for placing the shaft 56 in driving relation to the shaft 16. A machine brake 57, having a machine brake winding 57w, is associated with the shaft 56 for promptly stopping further rotation thereof under certain operating conditions. The shaft 56 is connected through reduction gearing, as indicated schematically in FIG. 9, as comprising the reduction gearing 55 to 81, to rotate the cam shaft 80 or the auxiliary cam shaft 227 for rotating the cams 271 to 275 shown in FIG. 2 and also shown diagrammatically in FIG. 9. These cams are associated, respectively, with contacts 271a to 275a, which are closed and opened once for each revolution of the auxiliary cam shaft 227 or of the cam shaft 80 at and for the times indicated in the chart shown in FIG. 11. It will be observed that contacts 272a and 273a are connected in series and that contacts 274a and 275a are similarly connected. Thus these two sets of contacts function as single sets of contacts. However, it is desirable to use the series arranged contacts in order to be able to adjust independently the cam 273, for example, to control the closure of contacts 273a and also to adjust independently the position of the cam 272 for the purpose of controlling the opening of the contacts 272a. The same relationship is possible with respect to the cams 275 and 274 and their contacts 275a and 274a, respectively, to the end that the overlapping times during which these sets of contacts are closed can be accurately adjusted.

Continuing on with respect to the diagrammatic showing of FIG. 9, it will be recalled that the drive motor 17 also drives through the head clutch 12, having an operating winding 12w, to drive the shaft 10 on which the head brake 11, having a head brake winding 11w, is provided for stopping rotation of the shaft 10 on deenergization of the head clutch 12. Associated with the shirring head 31 is the reel 5 on the shaft 6 on which the reel brake 7 is mounted and which has a reel brake winding 7w that is energized to stop further rotation of the reel 5.

Also driven with the shaft 10, as described hereinbefore, are the head counter 282 and the machine counter 283. The head counter 282 is driven by the continuously rotating sprocket 280 as long as the shaft 10 continues to rotate. The head counter 282 has a head counter clutch winding 282w which is arranged to be energized on the occurrence of certain operating conditions to be described. The head counter 282 is provided with normally closed contacts 282a and normally opened contacts 282b that are arranged to open and close, respectively, when the head counter clutch winding 282w is energized and to close and open, respectively, after a predetermined length, for example, 16′, of the unshirred casing 4 has been withdrawn from the reel 5 and moved past the squeeze roll 8. The head counter 282 also is provided with normally open contacts 282c which are arranged to close after energization of the head counter clutch winding 282w only at such a time that a predetermined length for example, 15.33′ of unshirred casing 4 has moved past the squeeze roll 8, at which time they close momentarily and then open.

The machine counter 283 is provided with a machine counter clutch winding 283w which is arranged to be energized under certain operating conditions for controlling the operation of the severing machine 93. It also is provided with normally open contacts 283a and 283b which are arranged to close when the machine counter clutch winding 283w is energized and to remain closed until a predetermined length, for example 3′, of unshirred casing 4 has moved past the squeeze roll 8, whereupon these contacts open.

FIG. 10 shows, diagrammatically, the circuit connections that can be used for controlling the operation, selectively, of the shirring head 31 and of the severing machine 93. In this circuit diagram certain of the components shown in FIG. 9 are reproduced and in addition relays are illustrated and their circuit connections are shown.

In the event that the unshirred casing 4 were of infinite length and without any splices 242 appearing therealong, the operation of the shirring machine 1 could be continuous insofar as it being necessary to adjust the operation in accordance with the occurrence of splices. Because of their presence at random locations a control system is provided, as disclosed, herein, whereby the loss incident to these splices 242 is minimized.

In describing the splice control means and its operation it will be assumed that the switches 219—219 are closed and that the motor 17 is energized. It also will be assumed that the machine clutch winding 58w is energized and that the shirred casing handling machine 3 is operating together with the periodic operation of the severing machine 93. It also will be assumed that the head clutch winding 12w is energized and that the head mechanism 2, including the shirring head 31, is continuously operating to form the completed strands 235 of shirred casing in the manner described hereinbefore. Depending upon the time in the period of operation of the severing machine 93 that a splice 242 is detected to operate the splice detecting contacts 258a, the shirring head 31 or the severing machine 93 will be selectively stopped to the end that the splice 242 always will be located in the next shirred strand and that the locus of severing will not coincide with a splice 242. Generally speaking, when the splice 242, if not detected, would appear in the next shirred strand relatively remote from the locus of severing, the shirring head 31 is stopped while the severing machine 93 continues to operate in such a manner as to perform the severing operation after the detected splice 242 has moved slightly past the locus of severing or the location of the scoring yoke or cutter 99. In such case the shirred strand containing the splice may be relatively long or relatively short depending upon operating conditions.

In the event that the splice 242 is detected at a location where it would coincide with the locus of severing of the next shirred strand, the severing machine 93 is stopped while the shirring head 31 continues to operate and shirr the casing to place the splice 242 slightly past the locus of severing after which the operation of the severing machine 93 is restarted to perform the severing operation. This operation is effected by the control circuits including the splice-at-cut relay 289, as subsequently described. In this case a shirred strand containing the splice is provided which is slightly longer than the shirred strand which is formed by the shirring machine 1 in the absence of a splice 242.

In considering the circuit connections shown in FIG. 10 it will be assumed that the switches 219—219 are closed and that the conductors 220—220 are energized. It has previously been pointed out that the conductors 218—218 are energized from a suitable alternating current source. It will be understood that the conductors 220—220 are similarly energized. Also it will be understood that, if it is preferable that the conductors 220—220 be energized from a direct current source, provision can be made for such energization. This can be accomplished by the use of a suitable rectifying means as is understood by those skilled in the art. On closure of the switches 219—219 head clutch relay winding 285w is energized over normally closed contacts 284b of a head relay that is indicated generally at 284 and has normally open contacts 284a and an operating winding 284w. The operating winding 285w forms a part of a head clutch relay, indicated generally at 285, and it has normally closed contacts 285a, normally open contacts 285b and normally closed contacts 285c. As long as the head clutch relay winding 285w remains energized, its contacts 285a and 285c are held open and contacts 285b are held closed to energize head clutch winding 12w in order to maintain the driving connection from the drive motor 17 to the shirring head 31 and thus it is maintained in operation to shirr the casing 23 onto the floating mandrel 22. It also will be observed that normally closed contacts 286a, of a machine relay, shown generally at 286 and having an operating winding 286w, complete a circuit for energizing a machine clutch relay winding 287w of a machine clutch relay that is indicated, generally, at 287 and has normally closed contacts 287a and normally open contacts at 287b. As long as the machine clutch relay winding 287w remains energized, contacts 287a are held open and contacts 287b are held closed to energize the machine clutch winding 58w and maintain the driving connection between the motor 17 and the shaft 56, thereby maintaining in operation the shirred casing handling machine 3 and in particular maintaining in operation the severing machine 93.

Insofar as the means for controlling the operation of the shirring machine 1 as a result of the occurrence of a splice 242 are concerned, the electrical system as shown in FIG. 10 remains in the condition just described with the head clutch winding 12w energized and the machine clutch winding 58w energized. It will be understood that other controls are provided to permit threading of the shirring machine 1 and to permit jogging of it for adjustment purposes, for testing, etc. Also various safety circuit arrangements can be provided as may be desired to prevent operation of some or all parts of the shirring machine 1 depending upon the requirements.

In describing the operation of the splice control system the circuit connections for which are shown in FIG. 10, it is pointed out that cam controlled contacts 271a are closed for the major portion of each rotation of the cam 271 or of the auxiliary cam shaft 227. The contacts 271a are closed at a time when the splice 242, if undetected, would ultimately appear at a position well past the locus of severing or well past the position of the scoring yoke or cutter 99 when it performs its next severing operation and these contacts continue to be in the closed position until slightly before the performance of the next severing operation. Accordingly, if the splice detecting contacts 258a are closed at a time when the splice 242, if undetected, would appear at a position relatively remote from the locus of severing of the next shirred strand, a circuit would be completed for energizing operating winding 288w of an auxiliary head relay that is shown, generally, at 288 and has normally open contacts 288a and 288b, normally closed contacts 288c which open as a result of time delay approximately .2 of a second after energization of operating winding 288w, normally open contacts 288d and normally closed contacts 288e. The energizing circuit for auxiliary head relay winding 288w is completed through normally closed contacts 289a of a splice-at-cut relay, shown generally at 289, having normally open contacts 289b and a splice-at-cut relay winding 289w. It will be understood that the splice detecting contacts 258a close only momentarily. However, this is long enough to complete the energizing circuit for the auxiliary head relay 288w which then seals in through contacts 288a and 288b, now closed, and normally closed contacts 290a of a reset relay, shown generally at 290, having a reset relay winding 290w and additional normally closed contacts 290b. A further result of the energization of auxiliary head relay winding 288w is to close contacts 288d which completes a circuit through time delay contacts 288c for energizing head counter clutch winding 282w. As soon as the head counter clutch winding 282w is energized contacts 282a are opened to prevent energization of reset relay winding 290w and contacts 282b are closed to complete a holding circuit for the head counter clutch winding 282w. Thereafter, time delay contacts 288c are opened but the holding circuit for head counter clutch winding 282w has been established through contacts 282b.

It will be recalled that the splice detecting contacts 258a have been assumed to be closed at such a time that the splice 242, if undetected, would be positioned well past the locus of severing by the scoring yoke or cutter 99. The operation of the shirring head 31 is maintained until this condition is realized since the head counter 282 is operated in accordance with the rotation of the measuring roll 9 or the movement of the unshirred casing 4 to the shirring head 31. The arrangement of the head counter 282 is such that its contacts 282c are momentarily closed and opened after a predetermined length of the shirred casing 4 has moved past the squeeze roll 8. As a result of the momentary closure of head counter contacts 282c, head relay winding 284w is energized and a holding circuit therefor is established on closure of its contacts 284a through the normally closed contacts 290b of reset relay 290. As a result of the energization of head relay 284w, its normally closed contacts 284b are opened to deenergize the previously indicated energizing circuit for head clutch relay winding 285w. It is deenergized to open contacts 285b for deenergizing head clutch winding 12w to interrupt the driving connection between the motor 17 and the shirring head 31. In addition at contacts 285a an energizing circuit for head brake winding 11w is completed and at contacts 285c an energizing circuit is completed for reel brake winding 7w. Rotation of the shaft 10 and operation of the shirring head 31 are promptly stopped as is further rotation of the reel 5. At this time the splice 242, which had been detected in the manner described, has been positioned just past the locus of severing so that the scoring yoke or cutter 99 will initiate the severing operation just to the right of the splice as it would be viewed in FIG. 2 of the drawings if it were there present. The shirring operation then will continue to be performed since the severing machine 93 and the associated shirred casing handling machine 3 continue to operate.

A short time after the head counter contacts 282c have closed to energize head relay winding 284w, contacts 282a of the head counter 282 are closed to complete part of the circuit for energizing reset relay winding 290w and contacts 282b are opened to open the holding circuit for the head counter clutch winding 282w and permitting it to reset. The reason for initiating the sequence of operations which results in stopping the shirring head 31 in advance of reclosing head counter contacts 282a and reopening head counter contacts 282b is to protect against excessive coast of the shirring head 31 resulting possibly from inadequate braking by the head brake winding 11w which might be injurious to the operation of the head counter 282.

Now it is desired that the shirring head 31 be restarted at a predetermined time in the cycle of operation of the severing machine 93. This is accomplished on closure of contacts 272a and 273a in series under the control of cams 272 and 273 which are driven in synchronism with the operation of the severing machine 93. Since head counter contacts 282a now are closed and, assuming that contacts 272a and 273a are closed in series at the time described, reset relay winding 290w is energized. At contacts 290a the previously traced holding circuit for auxiliary head relay winding 288w is opened and this relay is deenergized with the result that its contacts are opened and closed in the manner described. In addition the holding circuit for head relay winding 284w is opened at contacts 290b and head relay 284 is deenergized. Contacts 284b are reclosed to complete the energizing circuit for head clutch relay winding 285w. The energizing circuits for the head brake winding 11w and reel brake winding 7w are opened and at contacts 285b a circuit is completed for reenergizing the head clutch winding 12w. Thereafter the motor 17 drives through the shaft 10 to operate the shirring head 31 and associated parts.

It has been pointed out that it is undesirable to have the splice 242 appear at the locus of severing by the scoring yoke or cutter 99. The reason for this is that the added thickness provided by the splicing tape 241 would interfere adversely with the performing of the severing operation and might damage the scoring yoke or cutter 99. In the event that the splice 242 is detected at a location along the unshirred casing 4 where, if undetected, it would appear at the locus of severing, it is desirable to stop the operation of the severing machine 93 and of the associated shirring casing handling machine 3 while permitting the shirring head 31 to continue to operate and shirr the splice 242 past the locus of severing.

Assuming that the splice 242 is detected at a point where it otherwise would appear at the locus of severing, cam operated contacts 271a and series connected cam operated 272a and 273a are opened and for a brief period contacts 274a and 275a are closed in series to effect the energization of splice-at-cut relay winding 289w. While the energization of this winding 289w occurs each time that a strand is shirred, there is no resulting operation, except when splice detecting contacts 258a are closed during the time that the splice at cut relay winding 289w is energized and its contacts 289b are closed. On closure of splice-at-cut relay contacts 289b at the time that splice detecting contacts 258a are closed, an energizing circuit is completed for auxiliary machine relay winding 291w of an auxiliary machine relay, shown generally at 291. This relay has normally closed contacts 291a, that are opened with a time delay of the order of .2 second after energization of winding 291w, and normally open contacts 291b. At the time that auxiliary machine relay winding 291w is energized machine counter clutch winding 283w also is energized in parallel therewith and machine counter contacts 283a are closed to complete a holding circuit for windings 291w and 283w so that, after the time delay has expired for contacts 291a, and they open, the energizing circuit for these two windings is maintained through machine counter contacts 283a. A further result of the energization of splice-at-cut relay 289 is to open normally closed contacts 289a to prevent energization of auxiliary head relay winding 288w. At the time that machine counter clutch winding 283w is energized and machine counter clutch contacts 283a are closed, machine counter contacts 283b also are closed. The machine counter 283 then begins to measure the amount of unshirred casing 4 that moves past the measuring roll 9. Upon closure of machine counter contacts 283b, machine relay winding 286w is energized and its contacts 286a are opened to deenergize machine clutch relay winding 287w. Consequently machine clutch relay 287 is deenergized and its contacts 287b are opened to deenergize machine clutch winding 58w and its contacts 287a are closed to energize machine brake winding 57w. The driving connection from the motor 17 to the shirred casing handling machine 3 is interrupted and its operation is promptly stopped as a result of the application of the machine brake 57. This involves the stopping of the severing machine 93, and, since the shirring head 31 continues to operate, the casing 43 continues to be shirred until the splice 242 is just past the locus of severing by the scoring yoke or cutter 99. The machine counter 283 determines the length of this interval which is sufficient, as indicated, to permit a length of 3′ of unshirred casing to pass the squeeze roll 8 whereupon machine counter contacts 283a and 283b are opened. At contacts 283a the holding circuit for auxiliary machine relay winding 291w and for machine counter clutch winding 283w is opened and they are deenergized. At contacts 283b the energizing circuit for machine relay winding 286w is opened and this relay is deenergized. Its contacts 286a are reclosed to energize machine clutch relay winding 287w. In turn its contacts 287a are opened to deenergize machine brake winding 57w and its contacts 287b are closed to reenergize machine clutch winding 58w for the purpose of restoring the driving connection between the motor 17 and the shirred casing handling machine 3 and particularly with the severing machine 93.

In the event that the splice detecting contacts 258a should be closed as a result of the occurrence of a splice in the unshirred casing 4 at a time when cam operated contacts 271a are open or cam operated series connected contacts 274a and 275a are open, no control function is performed. The reason for this is that the setting of these contacts for operation is such that if the splice 242 is detected at a time when these contacts are not closed, it will then appear in the next shirred strand just past the locus of severing which is the position that it is desired that the splice appear. Accordingly, it is unnecessary to stop either the operation of the shirring head 31 or the operation of the severing machine 93 under these circumstances.

It will be recalled that the carriage 116 is reciprocated from right to left, as viewed in FIGS. 1–2, for each shirred strand 115 and then from left to right to repeat the operation for the next shirred and severed strand under the control of the carriage reciprocating cam 167 which rotates through a complete revolution for each shirred strand. The movement of the follower roll 165 in the cam groove 166 on the carriage reciprocating cam 167 and thereby the movement of the carriage 116 through a complete cycle is indicated by the curve 294 in the chart shown on FIG. 11. Here the abscissae represent degrees of rotation of the drum cam 165 with the zero position being chosen to correspond to the position where the carriage 116 is at the right end of its stroke with the carriage jaws 119 poised to engage the end of the strand 115 of shirred casing after it has been severed from the following shirred casing 43 adjacent the compaction rolls 44—45. As indicated by the curve 294, and described hereinbefore, the follower roll 165 is operated in accordance with the shape of the cam groove 166 to move the carriage 116 at varying speeds or to hold it first, for compressing the shirred strand, as indicated at 233 in FIG. 3, against the clamp members 65—65, then to remain motionless to hold the shirred strand 233 compressed against clamp members 65—65, thereafter, on opening the clamp members 65—65 to transfer the shirred and compressed strand 233 onto the receiving mandrel 187, then to dwell and finally to return to the initial position.

During the time that the carriage 116 is being moved according to the curve 294, the carriage jaws 119 are operating as shown by curve 295. At the initial position, the carriage jaws 119 are opened but, by the time that the carriage reciprocating cam 167 has rotated through about 30°, the follower roll 141 on the carriage jaw operating cam 143 has caused the carriage jaws 119 to close into juxtaposition with opposite sides of the floating mandrel 22 in order to engage the severed and reshirred end of the shirred strand 115 for the purpose of moving it along the floating mandrel 22 together with the movement of the carriage 116 in the manner described. The carriage jaws 116, as the curve 295 indicates, remain closed until the shirred strand has been transferred onto the receiving mandrel 187 that is in alignment with the floating mandrel 22. Then when the carriage reciprocating cam 167 has been rotated through about 240°, the carriage jaws 119 are opened and remain open until the next cycle of operation of the carriage 116 is initiated.

Normally the floating mandrel 22 is held against endwise movement and against rotation about its longitudinal axis by clamp members 65—65. Curve 296 shows the operation of cam members 65—65 under the control of the follower roll 75 as determined by the shape of cam groove 76 in mandrel clamp cam 77. At the time that the carriage 116 starts to move from right to left, the clamp members 65—65 engage and hold the floating mandrel 22 against movement. It is necessary to move the clamp members 65—65 out of holding engagement with the floating mandrel 22 in order to permit the shirred and compressed strand 115 to be transferred to the receiving mandrel 187 in alignment therewith. Accordingly, after the carriage reciprocating cam 167 has rotated through about 120° and while its jaws 119 are holding the shirred strand compressed against the clamp members 65—65, they are opened as a result of movement of follower roll 75 in the cam groove 76 in the mandrel clamp cam 77. The clamp members 65—65 remain unclamped or open during the transfer of the shirred strand, as indicated by curve 294, from the floating mandrel 22 onto the receiving mandrel 187 in alignment therewith. Then, after the transfer has been completed, the clamp members 65—65 are again closed to engage the floating mandrel 22 and hold it against movement throughout the remainder of cycle of operation.

During the time that the clamp members 65—65 are out of engagement with the floating mandrel 22, it must be held against movement and for this purpose the receiving mandrel 187 in alignment therewith is moved into endwise engagement with it as indicated by curve 297. This curve traces the movement of follower roll 191 in the cam groove 192 of the receiving mandrel shifter cam 193. At the start of the movement of the carriage 116 from right to left, the receiving mandrel 187 in alignment with the floating mandrel 22 is withdrawn as indicated by the initial portion of curve 297. Prior to the unclamping of the clamp member 65—65 from the floating mandrel 22, the receiving mandrel 187 aligned with the floating mandrel 22 is moved endwise under the control of follower roll 191 and operation of the receiving mandrel shifter arm 188 to engage the floating mandrel 22. Following this, as indicated by curve 296, the clamp members 65—65 are opened. While they remain disengaged from the floating mandrel 22, it is held against movement by the receiving mandrel 187. Then, following reclamping of the floating mandrel 22 by the clamp members 65—65, as shown by curve 296, the receiving mandrel 187, now having the shirred strand transferred thereto, is moved endwise out of engagement with the floating mandrel 22 under the control of the follower roll 191 as determined by the shape of the cam groove 192 in the receiving mandrel shifter cam 193. The receiving mandrel shifter arm 188 then remains in the withdrawn position during the remainder of the cycle.

The turret 177 is indexed twice for each cycle of operation of the carriage 116. This is shown by curve 298 which is indicated as being in two sections. It reflects the movement of the follower rolls 182 in the cam groove 183 on the turret index cam 184. It will be observed that the turret 177 is indexed to rotate the receiving mandrels 187 to the next position only during the time that the clamp members 65—65, as represented by the curve 296, are in the clamped position with the receiving mandrel 187 in alignment with the floating mandrel 22 in retracted position as indicated by curve 297.

At the lower portion of the chart shown on FIG. 11 there are illustrated the various times that the cam controlled contacts 221a, 222a, 223a, and 271a to 275a are closed or open. The times during the cycle of operation of the carriage 116 or the rotation of the carriage reciprocating cam 167 that these contacts are closed are indicated by the horizontally lined portions associated with the respective reference characters applied to the contacts. The times during which the contacts are opened are represented by unlined portions of the chart.

Contacts 221a are closed to energize the solenoid 174 for controlling the operation of 3 way solenoid valve 173 for the air operator 172 at the beginning of the part of the movement of the carriage 116 when the shirred strand on the floating mandrel is being compressed against the clamp members 65—65. The air operator 172 assists in this operation and also in the transfer of the shirred casing from the floating mandrel 22 to the receiving mandrel 187. During the second hold or dwell period of the carriage 116 and just before it is returned, the contacts 221a are opened to deenergize the solenoid 174 to exhaust the compressed air to the atmosphere for free retraction of the connecting rod 171 to the initial position along with the carriage 116.

The contacts 222a, which control the operation of the solenoid 208 of the solenoid valve 207 that is associated with the compressor hydraulic operator 206 are closed to extend the connecting rod 205 and move the pusher 204 for, in turn, moving the next compressor-doffer 199 to compress the shirred strand on the associated receiving mandrel 187 against the compressor surface 202 of the compressor member 201, FIG. 4. The contacts 222a remain closed, as the chart shown on FIG. 11 indicates, while the turret 177 indexes one position in order to place the compressor-doffer 199 in position where, as a result of the next indexing step, it will react against holding surface 210 of holding member 209. Thereupon the contacts 222a are opened and the pusher 204 together with the connecting rod 205 are retracted as a result of the deenergization of the solenoid 208 and shifting of the solenoid valve 207 to permit reverse operation of the hydraulic operator 206.

Contacts 223a are closed, as shown by the chart in FIG. 11, at the end of the indexing operation, as indicated by curve 298, to energize the solenoid 217 of the solenoid valve 216 and cause the doffer hydraulic operator 215 to extend the connecting rod 214 and doffer yoke 213. At this time the doffer yoke 213 engages the compressor-doffer 199 on the receiving mandrel which is in the doffing position, as indicated in FIG. 4 of drawings. As a result of the energization of solenoid 217 by closure of contacts 223a, the doffer hydraulic operator 215 is caused to extend the connecting rod 214 with the result that the shirred and compressed strand 235 is doffed as indicated in FIG. 4.

Under normal operating conditions, absent a splice, the shirring machine 1 operates in accordance with the functions portrayed by curves 294 to 298 and contacts 221a, 222a, and 223a are periodically closed and opened at the times and for the times shown on the chart appearing in FIG. 11.

The chart shown in FIG. 11 also indicates the times during which contacts 271a to 275a are closed and opened. As previously pointed out contacts 271a are closed at a time immediately after the severing operation has been performed by the scoring yoke or cutter 99 under the control of the severing machine 93. These contacts remain closed for a major portion of the period of operation of the severing machine 93. They are opened at a time corresponding to the positioning of a splice, if present, slightly beyond the locus of severing.

Contacts 272a and 273a are closed for brief intervals and the time during which their closures overlap is the time during which a circuit therethrough is completed. It will be noted that this time is shortly after the carriage 116 starts to move from right to left and this corresponds to a time slightly after the severing operation has been completed so as to permit the starting of the shirring head 31 at such time that the next shirred strand will be of full length. As pointed out, a single set of contacts can be employed in lieu of the series connected contacts 272a and 273a provided that their times of closure and opening can be accurately adjusted under the control of the cam shaft 80 or auxiliary cam shaft 227.

Contacts 274a and 275a are both closed for only a brief interval to complete a circuit just prior to the closure of the contacts 271a. It has been pointed out that the time of joint closure of contacts 274a and 275a corresponds to the detection of a splice 242 which, if undetected, would appear at the locus of severing accomplished by the scoring yoke or cutter 99. This is a short interval and the degree of overlap has been so indicated in the chart shown on FIG. 11. Here again a single set of contacts can be employed provided their times of closure and opening can be accurately synchronized with the rotation of the cam shaft 80 or auxiliary cam shaft 227.

It is desirable that provision be made for detecting movement of the floating mandrel 22 out of its normal position where it is held by the mandrel clamps 65—65 or by the receiving mandrel 187 aligned therewith. Since the floating mandrel 22 is formed of magnetic material, a magnetic transducer 299, FIGS. 3 and 9, can be located in proximity to the leading end 21 for controlling the operation of proximity contacts 300. As long as the leading end 21 of the floating mandrel 22 remains in predetermined spaced relation to the magnetic transducer 299, the proximity contacts 300 remain closed and the motor 17 continues to be energized. However, should the floating mandrel 22 be moved out of operative position, the magnetic field affecting the magnetic transducer is changed and proximity contacts 300 are opened to de-energize the motor 17. On restoration of the floating mandrel 22 to its operative position, the proximity contacts 300 are reclosed and the motor 17 can be restarted to continue the operation of the shirring machine 1 provided that it is otherwise in condition to operate.

The clutch 12 which controls the driving connection between the shaft 10 and the motor 17 preferably is of a type that permits completion of the driving connection to the head mechanism 2 with a minimum of shock and, after the driving connection is established, maintains the driving connection without slippage. For these purposes a combination electrically operated friction clutch and an electrically operated tooth gear clutch are employed. The friction clutch is energized first to place the head mechanism in operation and then the tooth gear clutch is energized to insure that the driving connection without slippage is maintained. Both clutches are simultaneously deenergized when the driving connection is to be interrupted.

In the operation of the shirring machine 1 as described hereinbefore and illustrated by the curves shown by full lines in FIG. 11 the shirred strand 115 on the floating mandrel 22 is fully compressed as indicated at 233 in FIG. 3 against the clamp member 65—65 by the carriage jaws 119—119 as moved by the carriage 116 in its forward movement. Upon opening of the clamp members 65—65 under the control of the clamp cam 77, the compressed strand 233 expands slightly during its transfer to the receiving mandrel 187 in alignment with the floating mandrel 22. Thereafter, on a subsequent indexing of the turret 177, the compressed strand 233 is recompressed and held in the recompressed condition in the manner described until it is subsequently doffed.

In some instances, particularly where longer strands, i.e. 100′ or more, are shirred it is desirable to open the clamp members 65—65 before any compression action thereagainst takes place. This permits the shirred strand 115 to be moved with a minimum of friction off of the floating mandrel 22 onto the receiving mandrel 187 in alignment therewith and to be compressed thereon in the direction that the casing 43 is shirred following picking up of the respective compressor-doffer 199 and moving it to engage the stop 200. The continued movement of the carriage 116 with the carriage jaws 119 juxtaposed to the floating mandrel 22 and finally to the receiving mandrel 187 aligned therewith causes the shirred strand 115 to be compressed thereon for the principal part of the extent that it finally is compressed. For example, the shirred strand 115 can be compressed from 70 to 80% of its final compressed length by the movement of the carriage 116, the compression taking place from the last severed end of the shirred strand 115 and in the direction in which it previously was shirred.

Following the partial compression of the shirred strand 115 by the carriage 116 on the receiving mandrel 187 in alignment with the floating mandrel 22, the remaining compression of the shirred and partially compressed strand is effected against the surface 202 of compressor members 201 in the manner previously described by the forward movement of the compressor-doffer 199 under the control of the compressor means 206. It will be observed that the final compression of the shirred and partially compressed strand is effected in a direction opposite to the direction in which the strand previously was shirred and also that the compression force is exerted from the opposite end.

Where particularly long strands are involved, it is advantageous to effect the compressing actions from opposite ends of the strand in the manner just described in order that the final strand will be substantially uniformly compressed from end to end rather than being compressed more tightly at one end than it is at the other. When so compressed substantially uniformly from end to end, subsequent treatment of the doffed strand 235 is facilitated.

The modified action of the carriage 116 in performing the compressing action on the shirred strand 115 after the clamp member 65—65 are opened is illustrated by the broken line curve 294′ in FIG. 11 which shows how the groove 166 in the carriage reciprocating cam 167 is modified to cause movement different from the movement represented by the solid line curve 294. In addition the shape of the cam groove 76 in the clamp cam 77 is modified to open the clamp members 65—65 as indicated by the broken line curve 296′ at such time that the opening thereof takes place before the juxtaposed end of the shirred strand 115 engages the clamp members 65—65. Accordingly, no compressing action takes place against the clamp members 65—65 when the clamp cam 77 is modified to open the clamp members 65—65 at the time indicated by curve 296′ with the result that the compressing action does not start until the carriage reciprocating drum cam 167 has been rotated through about 150° from the initial position at which time the respective compressor-doffer 199 has been picked up and has been moved against the stop 200. Under such conditions the transfer of the shirred strand 115 begins shortly after the clamp members 65—65 are opened and the transfer continues throughout the remaining forward movement of the carriage 116 until the carriage jaws 119 have moved the trailing end of the shirred strand 115 past the leading end of the receiving mandrel 187 in alignment with the floating mandrel 22. Thereafter, and during the succeeding dwell period of the carriage 116 represented by the rotation of the carriage reciprocating drum cam 167 from the position at 210° to the position at approximately 260°, the clamp members 65—65 are again moved into operative position with respect to the floating mandrel 22. At this time the carriage jaws 119 hold the trailing end of the compressed strand on the receiving mandrel 187 under compression. Following this, as previously described, the receiving mandrel 187 onto which the previously shirred strand 115 has been transferred is withdrawn, as indicated by curve 297, and then the turret 177 is indexed to bring the compressor-doffer 199 into operative position with respect to the pusher 204 of the compressor means 206 which moves forwardly, as indicated in FIG. 4, to complete the compression of the partially compressed strand against the surface 202 of the compressor member 201. When the shirred strand 115 is compressed only on a receiving mandrel 187 with no compressing action taking place on the floating mandrel 22, it is unnecessary to transfer from the floating mandrel 22 to the receiving mandrel 187 in alignment therewith a partially or fully compressed strand with the result that the innermost surfaces of the folds and pleats are not required to pass the joint between the floating mandrel 22 and the receiving mandrel 187 which might lead to the abrasion of the casing sufficient to develop pin holes therein which, when the stuffing operation is performed, would lead to unsatisfactory operation.

What is claimed as new is:

1. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means for detecting the presence of a splice along the casing before it is severed, and means responsive to the detection of a splice by said splice detecting means for selectively controlling the operation of said shirring head and said severing machine in relation to the location of said splice with respect to the locus along the shirred casing of the severing of the next shirred strand from the following shirred casing to perform the next severing operation only at a location where said splice is present in said next shirred strand.

2. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means for detecting the presence of a splice along the casing before it is severed, and means responsive to the detection of a splice by said splice detecting means for controlling the operation of said shirring head in relation to the location of said splice with respect to the locus along the shirred casing of the severing of the next shirred strand from the following shirred casing to perform the next severing operation only at a location where said splice is present in said next shirred strand.

3. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means for detecting the presence of a splice along the casing before it is severed, and means responsive to the detection of a splice by said splice detecting means for controlling the operation of said severing machine in relation to the location of said splice with respect to the locus along the shirred casing of the severing of the next shirred strand from the following shirred casing to perform the next severing operation only at a location where said splice is present in said next shirred strand.

4. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means operated synchronously with said severing machine and occupying different positions depending upon the time in the cycle of operation of said severing machine that the severing operation is performed, means for detecting the presence of a splice along the casing before it is severed, and means responsive to the detection of a splice by said splice detecting means and the position of said synchronously operated means for selectively controlling the operation of said shirring head and said severing machine to perform the next severing operation only at a location where said splice is present in the next shirred strand.

5. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means operated synchronously with said severing machine and occupying different positions depending upon the time in the cycle of operation of said severing machine that the severing operation is performed, means for detecting the presence of a splice along the casing before it is severed, and means responsive to the detection of a splice by said splice detecting means and the position of said synchronously operated means for controlling the operation of said shirring head to perform the next severing operation only at a location where said splice is present in the next shirred strand.

6. In means for shirring thin walled cellulosic sausage casings and the like from a supply thereof of indefinite length having splices at random locations therealong, in combination, a mandrel, a head for shirring the casing onto said mandrel at a predetermined speed, a machine for periodically severing a shirred strand of the casing from the following shirred casing, means operated synchronously with said severing machine and occupying different positions depending upon the time in the cycle of operation of said severing machine that the severing operation is performed, means for detecting the presence of a splice along the casing before it is severed, and means responsive to the detection of a splice by said splice detecting means and the position of said synchronously operated means for controlling the operation of said severing machine to perform the next severing operation only at a location where said splice is present in the next shirred strand.

7. In means for shirring thin walled cellulosic sausage casings and the like from a supply thereof of indefinite length having splices at random locations therealong, in combination, a mandrel, a head for shirring the casing onto said mandrel, a machine for severing a shirred strand of the casing from the following shirred casing, a motor, head driving means operatively interconnecting said motor and said head to cause the latter to shirr the casing onto said mandrel at a predetermined speed, machine driving means operatively interconnecting said motor and said machine to sever periodically a shirred strand of the casing on said mandrel from the following shirred casing, first and second control contacts operated periodically in synchronism with the operation of said machine, said first control contacts being closed in advance of the severing of a shirred strand and remaining closed for a major portion of the time to the next severing of a shirred strand, and said second control contacts being closed during a relatively short time in advance of the closure of said first control contacts, means for detecting the presence of a splice in said casing, and means responsive to the detection of a splice by said splice detecting means and the positions of said first and second control contacts for selectively controlling the operation of said shirring head and said severing machine to perform the next severing operation only at a location where said splice is present in the next shirred strand.

8. In means for shirring thin walled cellulosic sausage casings and the like from a supply thereof of indefinite length having splices at random locations therealong, in combination, a mandrel, a head for shirring the casing onto said mandrel, a machine for severing a shirred strand of the casing from the following shirred casing, a motor, head driving means operatively interconnecting said motor and said head to cause the latter to shirr the casing onto said mandrel at a predetermined speed, machine driving means operatively interconnecting said motor and said machine to sever periodically a shirred strand of the casing on said mandrel from the following shirred casing, first and second control contacts operated periodically in synchronism with the operation of said machine, said first control contacts being closed in advance of the severing of a shirred strand and remaining closed for a major portion of the time to the next severing of a shirred strand, and said second control contacts being closed during a relatively short time in advance of the closure of said first control contacts, a head counter operatively connected to said head, a machine counter operatively connected to said head; means for detecting the presence of a splice in said casing, and means responsive to the detection of a splice by said splice detecting means, the positions of said first and second control contacts, and said head and machine counters for selectively controlling the stopping of said shirring head and said severing means respectively according to predetermined lengths of the casing shirred by said head to perform the next severing operation only at a location where said splice is present in the next shirred strand.

9. In a machine for shirring thin walled cellulosic sausage casings and the like, in combination, a floating mandrel having a leading end for extending into a tubular unshirred casing and a trailing end, means releasably supporting said floating mandrel in a predetermined position, means to support said mandrel in said predetermined position during release of said releasable supporting means, a shirring head in cooperative relation to said floating mandrel for shirring the casing onto the same, means driving said shirring head, and means responsive to movement of said floating mandrel out of said predetermined position for controlling the operation of said driving means to stop said shirring head.

10. In a machine for shirring thin walled cellulosic sausage casings and the like, in combination, a floating mandrel having a leading end for extending into a tubular unshirred casing and a trailing end, clamp means holding said floating mandrel at said trailing end in said predetermined position, a receiving mandrel movable into and out of engagement with said trailing end of said floating mandrel for holding it in said predetermined position when said clamp means is unclamped, a shirring head in cooperative relation to said floating mandrel for shirring the casing onto the same, means driving said shirring head, and means responsive to movement of said floating mandrel out of said predetermined position for controlling the operation of said driving means to stop said shirring head.

11. In a machine for shirring thin walled cellulosic sausage casings and the like, in combination, a floating mandrel having a leading end for extending into a tubular unshirred casing and a trailing end, means releasably supporting said floating mandrel in a predetermined position, means to support said mandrel in said predetermined position during release of said releasable supporting means, a shirring head in cooperative relation to said floating mandrel for shirring the casing onto the same, means driving said shirring head, electro-responsive means in cooperative relation to said floating mandrel for detecting movement thereof away from said predetermined position, and means operated by said electro-responsive means for controlling the operation of said driving means to stop said shirring head.

12. The invention as set forth in claim 11 wherein the leading end of the floating mandrel is formed of magnetic material, and the electro-responsive means is a magnetic transducer located in proximity to said leading end of said floating mandrel.

13. In an apparatus for shirring thin walled cellulosic sausage casings and the like from a supply thereof of indefinite length having splices at random locations therealong, in combination, a mandrel, a head for shirring the casing onto said mandrel, a machine for severing a shirred strand of the casing from the following shirred casing, means for driving said head to shirr the casing onto said mandrel at a predetermined speed, means for driving said machine to sever periodically a shirred strand of the casing on said mandrel from the following shirred casing, a motor for driving said head driving means and said machine driving means; first and second control contacts operated periodically in synchronism with the operation of said machine, said first control contacts being closed in advance of the severing of a shirred strand and remaining closed for a major portion of the time to the next severing of a shirred strand, and said second control contacts being closed during a relatively short time immediately after the severing of a shirred strand; a head counter operatively connected to said head and including a winding and contacts that are closed a predetermined time after energization of said winding corresponding to a predetermined length of the casing shirred by said head, an electric head clutch interposed in said head driving means having a winding operable when energized to establish the driving connection between said motor and said head, a head relay including winding energized on closure of said head counter contacts and having relay contacts connected to energize said head clutch winding when said relay winding is deenergized, a reset relay including a winding energized on closure of said second control contacts and having contacts connected to energize said head relay winding when said reset winding is deenergized, splice detecting means including contacts that are closed on the detection of a splice to energize said head counter winding only when said first control contacts are closed and thereafter to close said head counter contacts to energize said head relay winding to open said head relay contacts and deenergize said head clutch winding and stop operation of said head, and said machine continuing to operate until said second control contacts are closed to energize said reset relay winding and open said reset relay contacts to deenergize said head relay winding and close said head relay contacts to energize said head clutch winding and reestablish the driving connection to said head.

14. In an apparatus for shirring thin walled cellulosic sausage casings and the like from a supply thereof of indefinite length having splices at random locations therealong, in combination, a mandrel, a head for shirring the casing onto said mandrel, a machine for severing a shirred strand of the casing from the following shirred casing, means for driving said head to shirr the casing onto said mandrel at a predetermined speed, means for driving said machine to sever periodically a shirred strand of the casing on said mandrel from the following shirred casing, a motor for driving said head driving means and said machine driving means, control contacts closed and opened periodically in synchronism with the operation of said machine a predetermined time in advance of the severing of a shirred strand, splice detecting means including contacts that are closed on the detection of a splice, a machine counter operatively connected to said head and including a winding and contacts that are closed on energization of said winding and remain closed for a time corresponding to a predetermined length of the casing shirred by said head whereupon said machine counter contacts are opened, an electric machine clutch interposed in said machine driving means having a winding operable when energized to establish the driving connection between said motor and said machine, a machine relay including a winding energized on closure of said machine counter contacts and having relay contacts connected to energize said machine clutch winding when said relay winding is deenergized, a splice-at-cut relay including a winding energized on closure of said control contacts and having relay contacts connected to energize said machine counter winding only when said splice-detecting contacts are closed and thereafter to close said machine counter contacts to energize said machine relay winding to open said machine relay contacts and deenergize said machine clutch winding and stop operation of said machine while said head continues to shirr the casing on said mandrel, and opening of said machine counter contacts deenergizing said machine control relay winding to close said machine relay contacts to energize said machine clutch winding and reestablish said driving connection to said machine.

15. An apparatus according to claim 13 which includes third control contacts operated in synchronism with said machine a predetermined time in advance of the severing of a shirred strand, said third control contacts being closed during a relatively short time in advance of the closure of said first control contacts, a machine counter operatively connected to said head and including a winding and contacts that are closed on energization of said winding and remain closed for a time corresponding to a predetermined length of the casing shirred by said head whereupon said machine counter contacts are opened, an electric machine clutch interposed in said machine driving means having a winding operable when energized to establish the driving connection between said motor and said machine, a machine relay including a winding energized on closure of said machine counter contacts and having relay contacts connected to energize said machine clutch winding when said relay winding is deenergized, a splice-at-cut relay including a winding energized on closure of said third control contacts and having relay contacts connected to energize said machine counter winding only when said splice-detecting contacts are closed and thereafter to close said machine counter contacts to energize said machine relay winding to open said machine relay contacts and deenergize said machine clutch winding and stop operation of said machine while said head continues to shirr the casing on said mandrel, and opening of said machine counter contacts deenergizing said machine control relay winding to close said machine relay contacts to energize said machine clutch winding and reestablish said driving connection to said machine.

16. An apparatus according to claim 15 which includes second head counter contacts that are opened and closed on energization and deenergization respectively of said head counter winding, a head clutch relay including a relay winding and relay contacts connected to energize said head clutch winding on energization of said head clutch relay winding, said reset relay winding being connected for energization in series with said second control contacts and said second head counter contacts when those contacts are closed, the opening of said head relay contacts being operable to deenergize said head clutch relay winding and open said head clutch relay contacts to deenergize said head clutch, and the deenergization of said head relay winding being operable to close said head relay contacts to energize said head relay winding and to close said head clutch relay contacts and energize said head clutch winding to reestablish operation of said shirring head, a machine clutch relay including a winding and relay contacts connected to energize said machine clutch winding on energization of said machine clutch relay winding being connected for operation by the contacts of said machine relay to start and stop operation of said machine.

References Cited in the file of this patent
UNITED STATES PATENTS

| | | |
|---|---|---|
| 2,010,626 | Dietrich | Aug. 6, 1935 |
| 2,231,537 | Keeler | Feb. 11, 1941 |
| 2,583,654 | Korsgaard | Jan. 29, 1952 |
| 2,636,951 | Fahringer | Apr. 28, 1953 |
| 2,722,714 | Blizzard et al. | Nov. 8, 1955 |
| 2,929,245 | Fischer | Mar. 22, 1960 |

UNITED STATES PATENT OFFICE
CERTIFICATE OF CORRECTION

Patent No. 3,112,516                        December 3, 1963

Arthur A. Bonnee

It is hereby certified that error appears in the above numbered patent requiring correction and that the said Letters Patent should read as corrected below.

Column 4, line 16, for "shirring the" read -- the shirring --; line 71, for "mandrell" read -- mandrel --; column 5, line 27, for "is", first occurrence, read -- it --; column 7, line 20, for "pitch" read -- pinch --; column 8, line 53, for "carirage" read -- carriage --; column 9, line 64, for "these" read -- there --; column 13, line 26, for "he" read -- the --; line 71, for "reciving" read -- receiving --; column 14, line 1, for "a" read -- an --; line 12, for "falilitates" read -- facilitates --; column 15, line 4, for "squeze" read -- squeeze --; line 59, for "88" read -- 8 --; column 25, line 44, for "member" read -- members --; column 32, line 19, after "winding" insert -- , said machine clutch relay winding --.

Signed and sealed this 17th day of November 1964.

(SEAL)
Attest:

ERNEST W. SWIDER                        EDWARD J. BRENNER
Attesting Officer                       Commissioner of Patents